(12) United States Patent
Kozuka et al.

(10) Patent No.: US 6,466,735 B1
(45) Date of Patent: Oct. 15, 2002

(54) OPTICAL DISK AND REPRODUCTION APPARATUS FOR PRODUCING OPTICAL DISK

(75) Inventors: Masayuki Kozuka, Neyagawa; Masataka Minami, Kobe; Kazuoki Otani, Yokohama; Osamu Kawashima, Tokyo; Yoshihisa Fukushima; Yoshiho Gotoh, both of Osaka, all of (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/154,122

(22) Filed: Sep. 16, 1998

(30) Foreign Application Priority Data

Sep. 17, 1997 (JP) .............................. 9-251883

(51) Int. Cl.$^7$ .............................. H04N 5/781
(52) U.S. Cl. ................. 386/126; 701/201; 701/208; 701/210; 369/273; 369/275.1
(58) Field of Search .................. 386/45, 125, 126; 369/14, 273, 275.1, 275.2, 275.3, 275.4, 275.5; 701/201, 202, 205, 207, 208, 209, 210, 211; 340/990, 995; 342/357.01, 457; H04N 5/76, 5/92, 5/781

(56) References Cited

U.S. PATENT DOCUMENTS 5,150,339 A * 9/1992 Ueda et al. ............. 369/275.2
5,535,125 A    7/1996 Okabe
6,061,628 A * 5/2000 Hayashi et al. ............. 701/208

FOREIGN PATENT DOCUMENTS

| EP | 0 734 007 A1 |   | 9/1996 |           |
|----|--------------|---|--------|-----------|
| FR | 2743168      |   | 7/1997 |           |
| JP | 9-81959      | * | 3/1997 | G11B/7/24 |
| JP | 09091959     |   | 3/1997 |           |

* cited by examiner

Primary Examiner—Thai Tran
(74) Attorney, Agent, or Firm—Price and Gess

(57) ABSTRACT

The car navigation file of the optical disk stores data which is used for navigating the car, and the video title set stores a plurality of video titles concerning facilities located in districts included in the map data. A VOB comprising one scene of a video image of a video title is a filmed shot in high picture quality. The VOB includes a writing command that position information of a position associated with the video information be written in the rewitable area when the predetermined operation is performed during the reproduction of the optical disk. When the disk reproduction apparatus executes the writing command, the position information can be written in the rewritable area. Consequently, the user can easily have the destination written in the optical disk, enjoying the filmed shots.

8 Claims, 24 Drawing Sheets

(LARGE-SCALE MAP)

(SMALL-SCALE MAP)

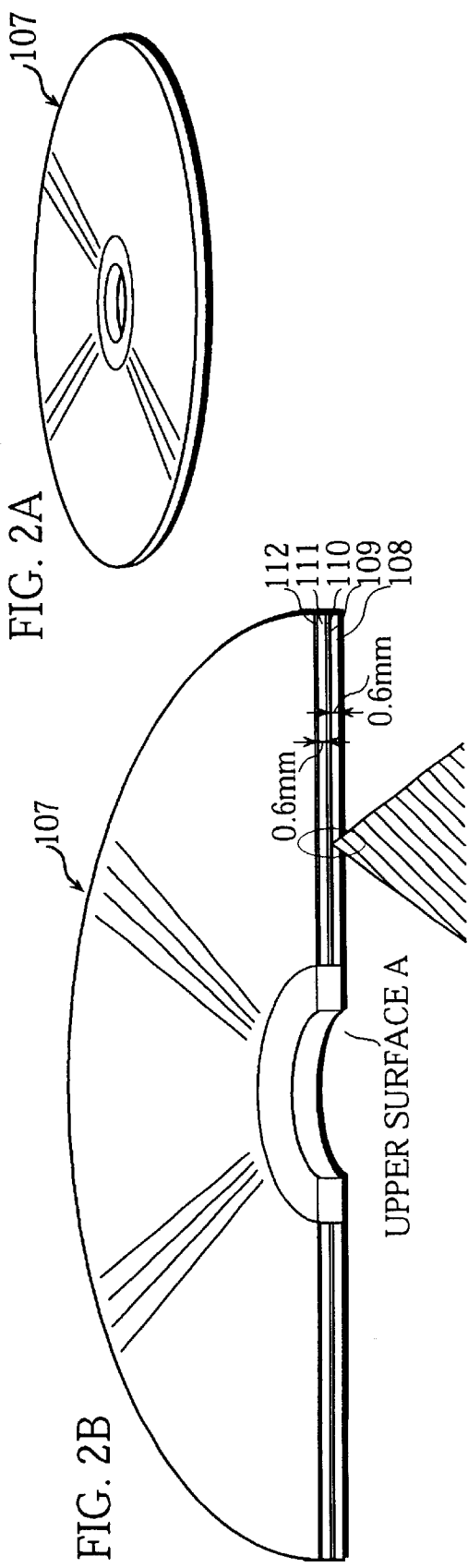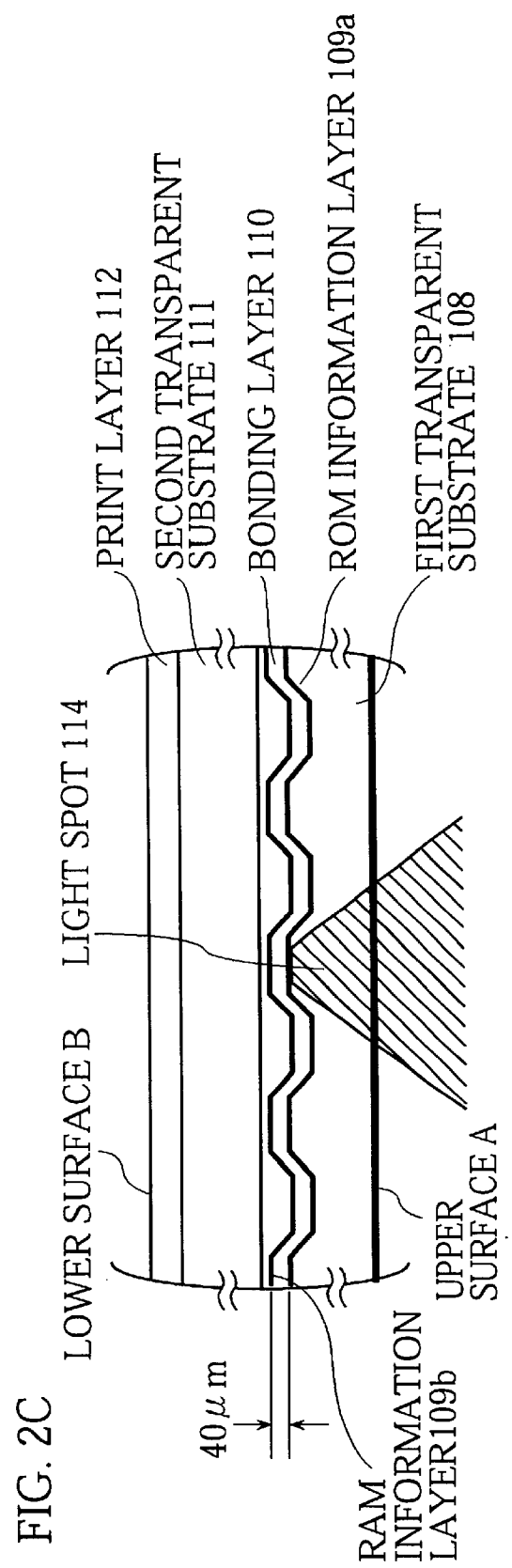
FIG. 2A
FIG. 2B
FIG. 2C

FIG. 8A

MAP DATA

| |
|---|
| upper left longitude |
| upper left latitude |
| lower right longitude |
| lower right latitude |
| link information to northwest of 8-neighbor map data |
| link information to north of 8-neighbor map data |
| link information to northeast of 8-neighbor map data |
| link information to east of 8-neighbor map data |
| link information to southwest of 8-neighbor map data |
| link information to south of 8-neighbor map data |
| link information to southwest of 8-neighbor map data |
| link information to west of 8-neighbor map data |
| link information to map image data |
| link information to upper scale map data |
| link information to lower scale map data showing details of northeast |
| link information to lower scale map data showing details of northwest |
| link information to lower scale map data showing details of southeast |
| link information to lower scale map data showing details of southwest |
| link information to landmark data |
| link information to road node data |

FIG. 8B road node data

| |
|---|
| latitude and longitude of road node |
| road type information(road width, number of lanes, national road information, etc) |
| link information to road node data of lower scale map |
| link information to road node data of upper scale map |
| number of neighboring nodes |
| link information to neighboring node × number of nodes |

FIG. 8C landmark data

| |
|---|
| latitude and longitude of landmark |
| landmark type information(amusement park, hospital, etc) |

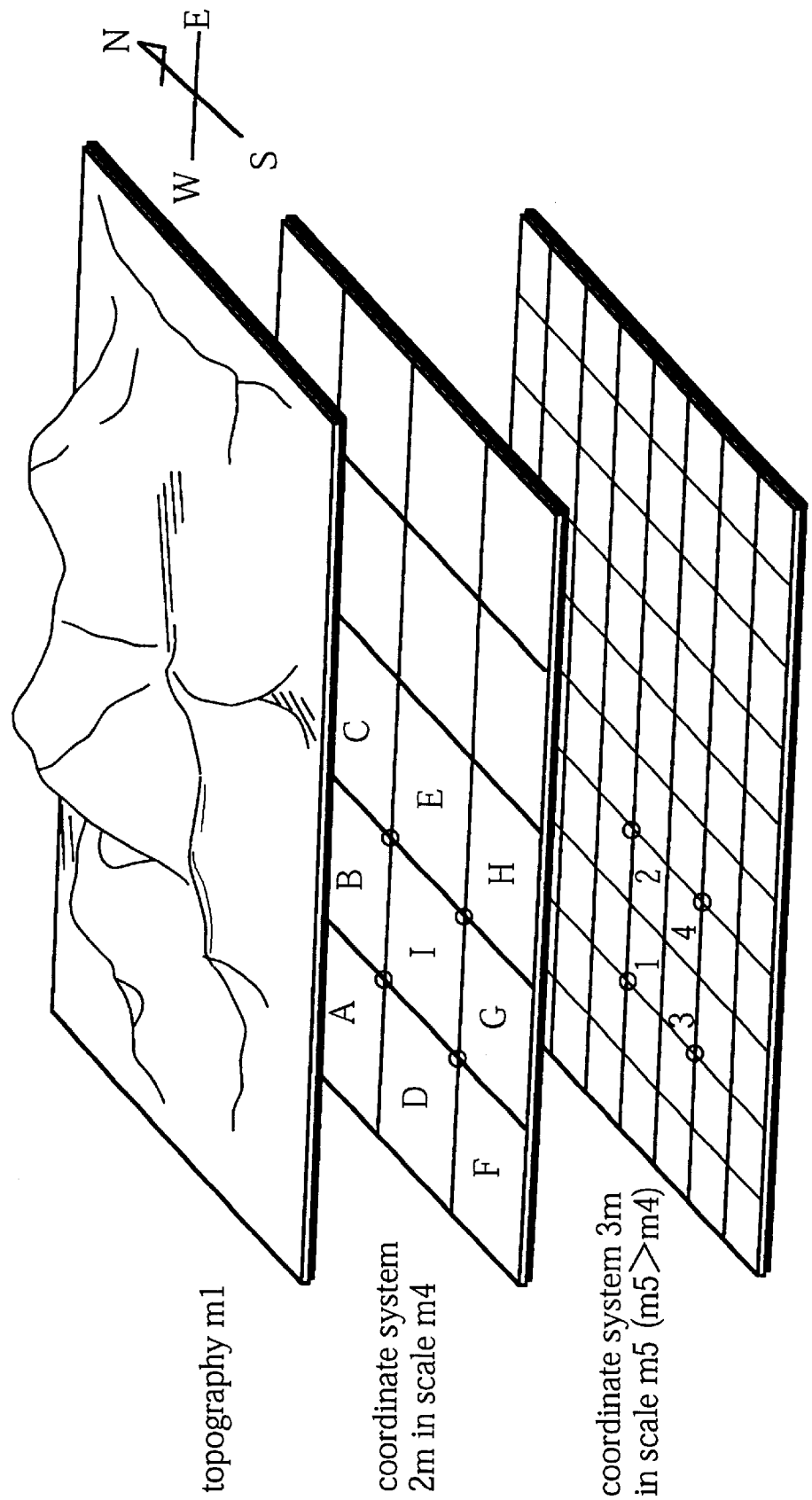

FIG. 12

VOLUME MENU

Leisure spots in Osaka Prefecture are presented.

Select one item.

( Osaka Tower )
( Osaka Aquarium )   ( Osaka Dome )

FIG. 14

VOBU #0 (00 hours 00 minutes 00.00 seconds) →

| management information pack 0 | video pack 0.1 | video pack 0.2 | video pack 0.3 | ------ | video pack 0.98 | video pack 0.99 | audio pack 0.1 | sub-picture pack 0.1 |
|---|---|---|---|---|---|---|---|---|

VOBU #1 (00 hours 00 minutes 00.50 seconds) →

| management information pack 1 | video pack 1.1 | video pack 1.2 | video pack 1.3 | ------ | video pack 1.98 | video pack 1.99 | audio pack 1.1 | sub-picture pack 1.1 |
|---|---|---|---|---|---|---|---|---|

VOBU #2 (00 hours 00 minutes 01.00 seconds) →

| management information pack 2 | video pack 2.1 | video pack 2.2 | video pack 2.3 | ------ | video pack 2.98 | video pack 2.99 | audio pack 2.1 | sub-picture pack 2.1 |
|---|---|---|---|---|---|---|---|---|

VOBU #3 (00 hours 00 minutes 01.50 seconds) →

| management information pack 3 | video pack 3.1 | video pack 3.2 | video pack 3.3 | ------ | video pack 3.98 | video pack 3.99 | audio pack 3.1 | sub-picture pack 3.1 |
|---|---|---|---|---|---|---|---|---|

VOBU #4 (00 hours 00 minutes 02.00 seconds) →

| management information pack 4 | video pack 4.1 | video pack 4.2 | video pack 4.3 | ------ | video pack 4.98 | video pack 4.99 | audio pack 4.1 | sub-picture pack 4.1 |
|---|---|---|---|---|---|---|---|---|

VOBU #5 (00 hours 00 minutes 02.50 seconds) →

| management information pack 5 | video pack 5.1 | video pack 5.2 | video pack 5.3 | ------ | video pack 5.98 | video pack 5.99 | audio pack 5.1 | sub-picture pack 5.1 |
|---|---|---|---|---|---|---|---|---|

VOBU #6 (00 hours 00 minutes 03.00 seconds) →

| management information pack 6 | video pack 6.1 | video pack 6.2 | video pack 6.3 | ------ | video pack 6.98 | video pack 6.99 | audio pack 6.1 | sub-picture pack 6.1 |
|---|---|---|---|---|---|---|---|---|

VOBU #7 (00 hours 00 minutes 03.50 seconds) →

| management information pack 7 | video pack 7.1 | video pack 7.2 | video pack 7.3 | ------ | video pack 7.98 | video pack 7.99 | audio pack 7.1 | sub-picture pack 7.1 |
|---|---|---|---|---|---|---|---|---|

VOBU #8 (00 hours 00 minutes 04.00 seconds) →

| management information pack 8 | video pack 8.1 | video pack 8.2 | video pack 8.3 | ------ | video pack 8.98 | video pack 8.99 | audio pack 8.1 | sub-picture pack 8.1 |
|---|---|---|---|---|---|---|---|---|

VOBU #9 (00 hours 00 minutes 04.50 seconds) →

| management information pack 9 | video pack 9.1 | video pack 9.2 | video pack 9.3 | ------ | video pack 9.98 | video pack 9.99 | audio pack 9.1 | sub-picture pack 9.1 |
|---|---|---|---|---|---|---|---|---|

FIG. 16A

MANAGEMENT INFORMATION PACK

HIGHLIGHT INFORMATION

| color information |
|---|
| coordinate information |
| highlight command<br>    SetWriteRAM longtitude #m1,latitude #n1 |

FIG. 16B

SUB-PICTURE DATA

Naniwa Ward of Osaka City : Periphery of Osaka Tower

Set As Your Destination?

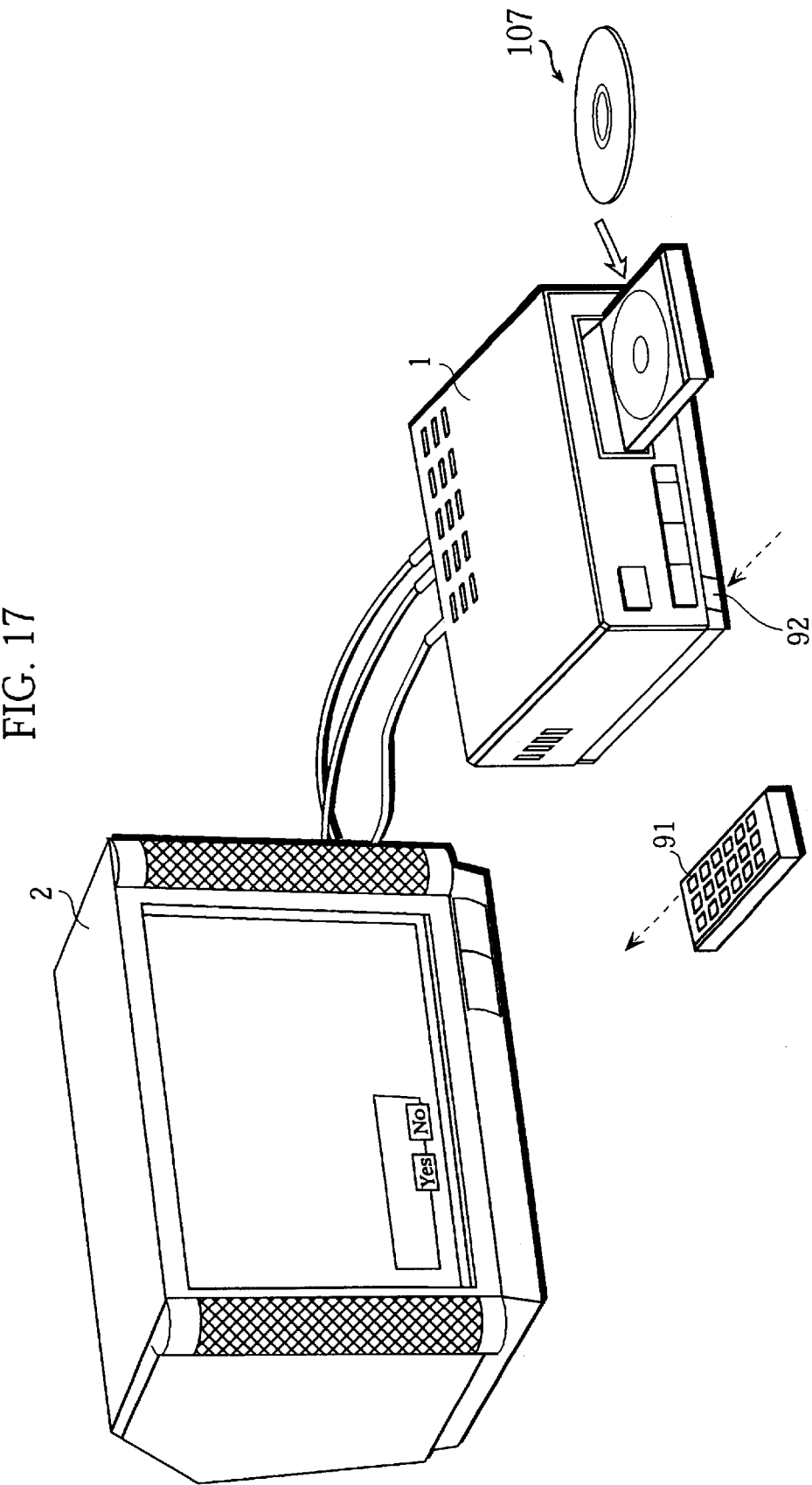

OPTICAL DISK AND REPRODUCTION APPARATUS FOR PRODUCING OPTICAL DISK

This application is based on an application No. 09-251883 filed in Japan, the content of which is hereby incorporated by reference.

BACKGROUND OF THE INVENTION

1. Field of the Invention

The present invention relates to an optical disk which records various information, such as map information and video information, and also relates to a reproduction apparatus which reproduces such optical disks.

2. Description of the Prior Art

Car guiding apparatuses (referred to as the "car navigation apparatuses" hereinafter) using GPS (Global Positioning System) have been necessities for car lovers.

The GPS referred to here means an in-car system that receives radio waves emitted from a satellite orbiting at an altitude of about 21,000 km and locates the current position of a running car. A conventional car navigation apparatus is provided with a GPS antenna for receiving the radio waves, a positioning unit for positioning longitude, latitude, and altitude of the current car position, a driving mechanism for loading a CD-ROM recording map information which is used for guiding the car and for controlling the reading of the CD-ROM, a compact display for displaying a map image of the area around the positioned longitude and latitude using the map information, a microcomputer for controlling various operations of the car navigation apparatus, a keypad, and an operating unit for receiving operations via a trackball.

As a trend in the car industry in recent years, functions for supporting the car drive at a high level have been increasingly demanded in addition to the function for locating the current car position.

Typical functions for supporting the car drive include a destination setting function, a current position setting function, and a route searching function.

By means of the destination setting function or the current position setting function, a part of the detailed road map used for the car drive is displayed on the compact display. The user moves a cursor up, down, left, and right by pressing cursor keys. When the cursor is in a desired position and the user performs a determination operation, the car navigation apparatus sets the current position of the cursor as the destination or the current position of the car.

By means of the route searching function, the car navigation apparatus automatically searches an optimum route between the current position and the destination set by the user, by referring to road node data which shows passing points on roads.

The map image displayed according to the map information is for practical use only. More specifically, the roads are mainly drawn in lines, and famous constructions and tourist spots are simply indicated in character strings as shown in FIGS. 1A and 1B. Moving the cursor on the map image drawn in only the lines and the character strings to set the destination lacks fun and it may be burdensome to the user.

The map image of a densely built-up area, in particular, is drawn in many lines and character strings, so that it will take a long time for the user to find the destination in such a dense map image. As a result, time taken for the destination setting may be increased.

In general, the user sets the destination using the car navigation apparatus provided in the car immediately before starting off on a trip. If it takes the user a long time to set the destination, the starting time for the trip is delayed. Even if the whole family get in the car early in the morning, the starting time for a family trip is delayed due to the burdensome setting of the destination and they may run into a traffic jam. To avoid this problem whereby it takes a long time to set the destination in the car before starting off on a trip, a so-called "hand-held car navigation apparatus" can be used. The user removes the hand-held car navigation apparatus from the car on the day before the trip, for example, so that the user can set the destination in the house in a relaxed mood. In this way, when the user sets the destination in the house using the hand-held car navigation apparatus, the operation for setting the destination can be reliably performed. However, there is still a problem that the user has to reinstall the apparatus in the car. This installing operation may include accompanying operations, such as adjustment of the antenna. Here, if it takes the user a long time to reinstall the apparatus in the car, the starting time is delayed.

Generally speaking, when the whole family goes on trip, the all family participate in deciding which tourist spot they will visit. It is desirable for the whole family to decide the tourist spot to visit together with the destination. In practice, however, the destination is set by a driver or a passenger sitting on the passenger seat due to the space restricted in the car. As such, those who are sitting on the rear seat cannot take part in setting the destination even if they want. Thus, conventional car navigation apparatuses are quite unsuitable for a purpose where the whole family decide the destination and the tourist spot to visit.

SUMMARY OF THE INVENTION

The first object of the present invention is to provide an optical disk which eliminates burdensomeness caused when the destination is set by making the destination setting more enjoyable.

The second object of the present invention is to provide an optical disk and a reproduction apparatus for reproducing the optical disk, using which the user can set the destination without burdensome operations, such as the reinstallation of the car navigation apparatus in the car.

The first and second objects of the present invention can be achieved by an optical disk made up of: a rewritable area; a first read only area for storing map information that is used for navigating the car; and a second read only area for storing a plurality of pieces of video information concerning facilities located in districts included in the map information and for storing a writing command that position information concerning a position of one of the facilities that is associated with one of the plurality of pieces of video information be written in the rewritable area when a predetermined operation is performed during a reproduction of the piece of video information.

With this construction, the first read only area of the optical disk stores the map information which is used for guiding the car and the second read only area stores a plurality of pieces of video information concerning facilities located in districts included in the map data. By making the video information using filmed shots that introduces the facilities, the user can decide which facility to visit, enjoying the filmed shots of the facilities.

Together with the video information, a writing command is included. The writing command indicates to write the position information of a position associated with the video information in the rewritable area when the predetermined operation is performed during the reproduction of the optical disk. By the execution of the writing command by the disk reproduction apparatus, the destination information can be written in the rewritable area. Consequently, the user can easily have the destination written in the optical disk, enjoying the filmed shots introducing the moving picture data. The user brings the optical disk with the position information being written to the car and inserts the optical disk into the car navigation apparatus installed in the car. By doing so, the user can have the map information as the destination displayed on the compact display and also have the car navigation apparatus search the route from the current position to the written destination. In this way, the car navigation apparatus reads the position information which has been easily written by the user in the house, displays the destination, and searches the route, thereby making it easy for the user to use the car drive supporting functions included in the car navigation apparatus. The video information is displayed on the TV set in the house and the destination is written in the rewritable area in accordance with the user operation. In this way, the whole family can participate in deciding the destination and the tourist spots to visit.

The first and second objects of the present invention can also be achieved by a reproduction apparatus which reproduces an optical disk comprising a rewritable area, a first read only area for storing map information that is used for navigating the car, and a second read only area for storing a plurality of pieces of video information concerning facilities located in districts included in the map information and for storing a writing command that position information concerning a position of one of the facilities that is associated with one of the plurality of pieces of video information be written in the rewritable area when a predetermined operation is performed during a reproduction of the piece of video information, the reproduction apparatus made up of; an optical pickup for optically reading data stored in the optical disk; a driving mechanism for moving the optical pickup; a moving picture decoder for decoding read video information; a receiving means for receiving a predetermined operation performed by a user; and a controlling means for controlling the driving mechanism to move the optical pickup so that the video information is read, for controlling the driving mechanism to move the optical pickup so that the writing command corresponding to the video information is read, and for controlling the driving mechanism to move the optical pickup so that the position information included in the writing command is written in the rewritable area.

By means of this reproduction apparatus, the position information is written in the rewritable area of the optical disk in accordance with the user operation while the video images are being reproduced. As a result, the user can easily have the destination stored in the optical disk.

The first and second objects of the present invention can also be achieved by a reproduction apparatus which reproduces an optical disk comprising a rewritable area, a first read only area for storing map information that is used for navigating the car, and a second read only area for storing a plurality of pieces of video information concerning facilities located in districts included in the map information and for storing a writing command that position information concerning a position of one of the facilities that is associated with one of the plurality of pieces of video information be written in the rewritable area when a predetermined operation is performed during a reproduction of the piece of video information, the reproduction apparatus made up of; an optical pickup for optically reading data stored in the optical disk; a driving mechanism for moving the optical pickup; a controlling means for controlling the driving mechanism to move the optical pickup so that the map information is read, and for controlling the driving mechanism to move the optical pickup so that the position information written in the rewritable area is read; and a car drive supporting means for supporting a car drive in accordance with the read map information and the read position information, the car drive supporting means including a fist displaying means for displaying map image and a second displaying means for displaying a mark indicating a destination at a point according to the read position information.

By means of this reproduction apparatus, the car drive can be supported in accordance with the destination which has been written in the rewritable area of the optical disk. Therefore, the user does not need to set the destination using the car navigation apparatus in the car, and a period of time taken until the car starts can be reduced.

BRIEF DESCRIPTION OF THE DRAWINGS

These and other objects, advantages and features of the present invention will become apparent from the following description thereof taken in conjunction with the accompanying drawings which illustrates a specific embodiment of the invention. In the drawings:

FIG. 2A shows an appearance of an optical disk used in the embodiment of the present invention;

FIG. 2B shows a sectional view of the optical disk;

FIG. 2C shows an enlarged view of a part where an optical spot is shone;

FIG. 8A shows a data format of map data;

FIG. 8B shows a data format of road node data;

FIG. 8C shows a data format of landmark data;

FIG. 9 shows representations of contents in the map data;

FIG. 12 is an example of a volume menu;

FIG. 14 is an example of VOB units;

FIG. 16A is an example of highlight information included in a management information pack;

FIG. 16B is an example of an icon included in sub-picture data;

FIG. 17 is a perspective view of a disk reproduction apparatus used in the embodiment of the present invention;

DESCRIPTION OF THE PREFERRED EMBODIMENT

Figure 1A:
FIGS. 1A and 1B show examples of conventional map images.
Figure 1B:
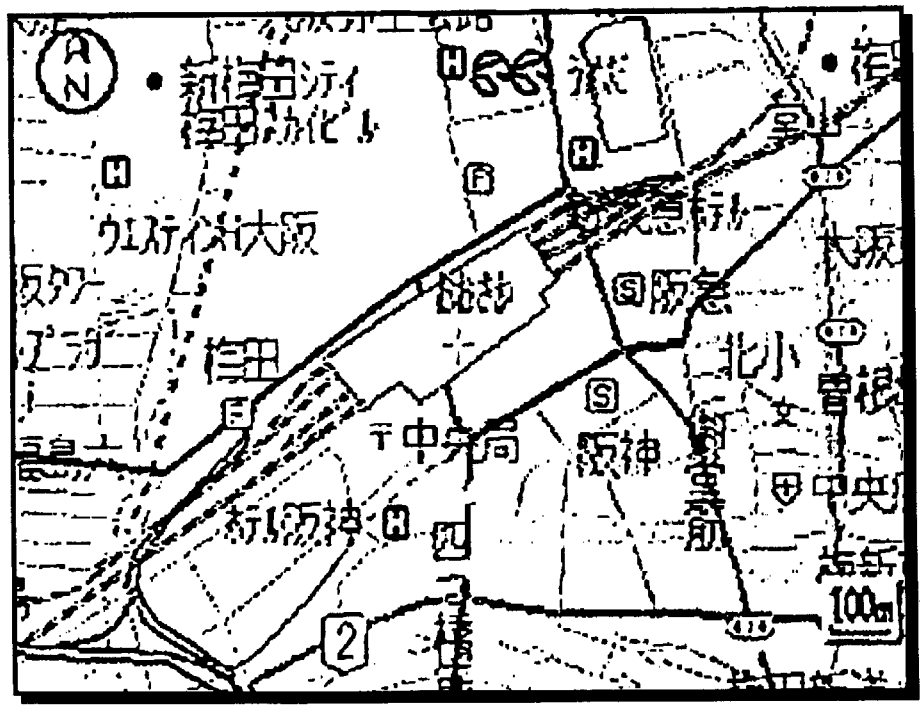

An optical disk suitable for the present embodiment is a digital video disk (referred to as the "DVD" hereinafter) which has two layers on a single side, with the two layers being a ROM information layer and a RAM information layer. Hereinafter, the DVD which has the two layers on the single side is referred to as the "two-layer DVD."

FIG. 2A shows an appearance of a two-layer DVD 107 and FIG. 2B shows a sectional view of the two-layer DVD 107. FIG. 2C shows an enlarged section part of FIG. 2B. Starting from the bottom, the two-layer DVD 107 is composed of a first transparent substrate 108, a ROM information layer 109a, a RAM information layer 109b, a bonding layer 110, a second transparent substrate 111, and a print layer 112 on which a label is printed.

The first transparent substrate 108 and the second transparent substrate 111 are both about 0.6 mm thick, that is in a range of about 0.5 mm to 0.7 mm, and are reinforcers of the same material.

A reflective membrane such as metal foil is attached to a surface of the ROM information layer 109a where it is in contact with the first transparent substrate 108. Indented and protruding pits are formed in this reflective membrane with high density using the molding technique.

Figure 3A:
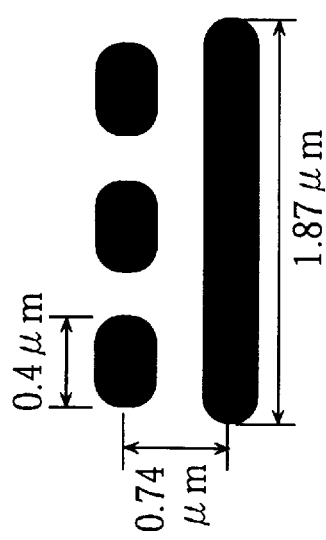
FIG. 3A shows shapes and sizes of pits provided on a ROM information layer.
Figure 3B:
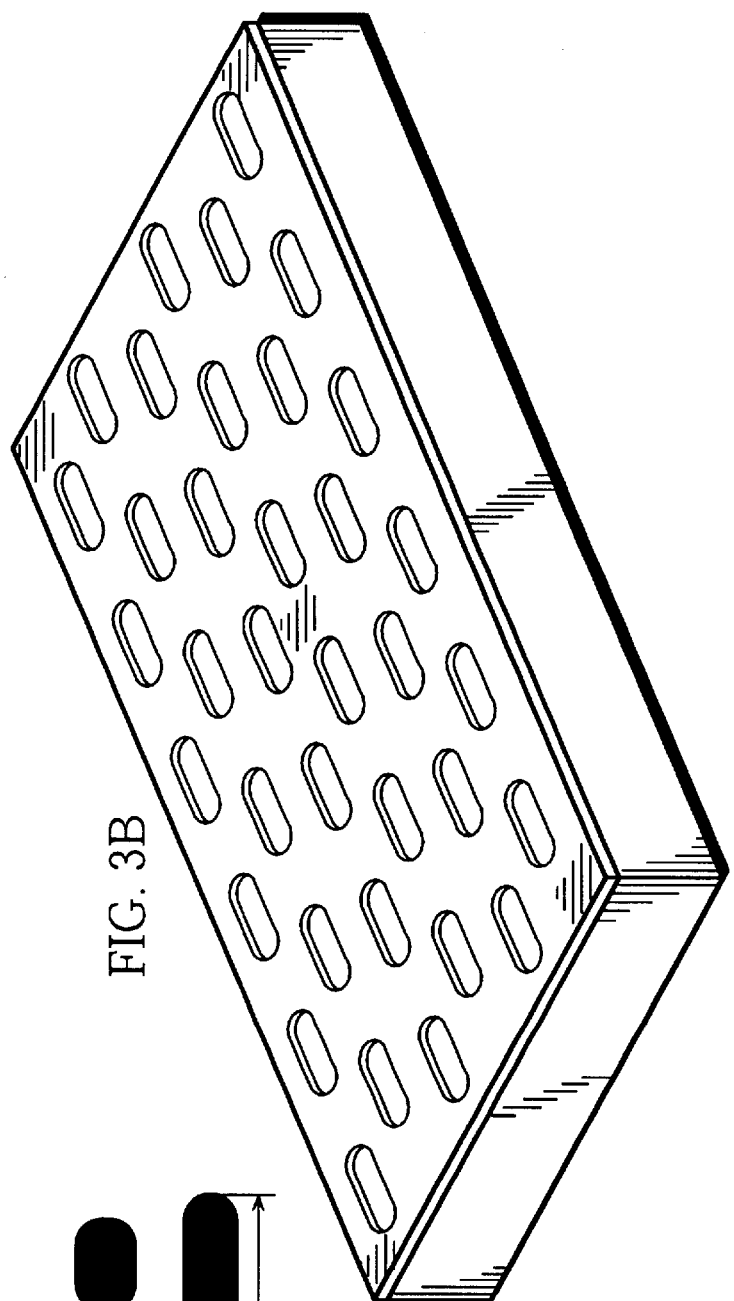
FIG. 3B shows pit sequences on the ROM information layer.

FIG. 3A shows shapes and sizes of pits, and FIG. 3B shows pit sequences on the ROM information layer 109a. As shown in FIG. 3A, the length of a pit ranges from 0.4 $\mu$m to 1.87 $\mu$m. A whole series of pits form a spiral track with a radial distance of 0.74 $\mu$m between the pit lines. Information is retrieved by shining a light beam on the series of pits and measuring changes in the reflection ratio of a light spot 114. The series of pits formed along the rotational direction of the disk form physical sectors.

Figure 3C:
FIG. 3C shows a format of a physical sector.

Each sector has the construction shown in FIG. 3C to secure the reliability of the data reading. The sector includes, as shown in FIG. 3C, a sector header area used for identifying each sector address, a user data area for storing 2 KB-data, and an error correction code storing area for storing an error correction code for the user data area in the same sector. The disk reproduction apparatus detects errors using the error correction code when the user data area in the same sector is read, and also corrects the detected errors.

Figure 4A:
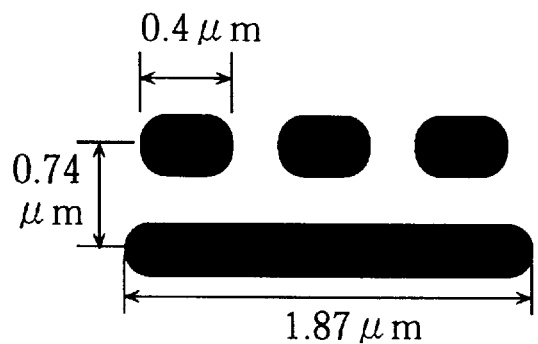
FIG. 4A shows shapes and sizes of pits on a header of a RAM information layer.
Figure 4B:
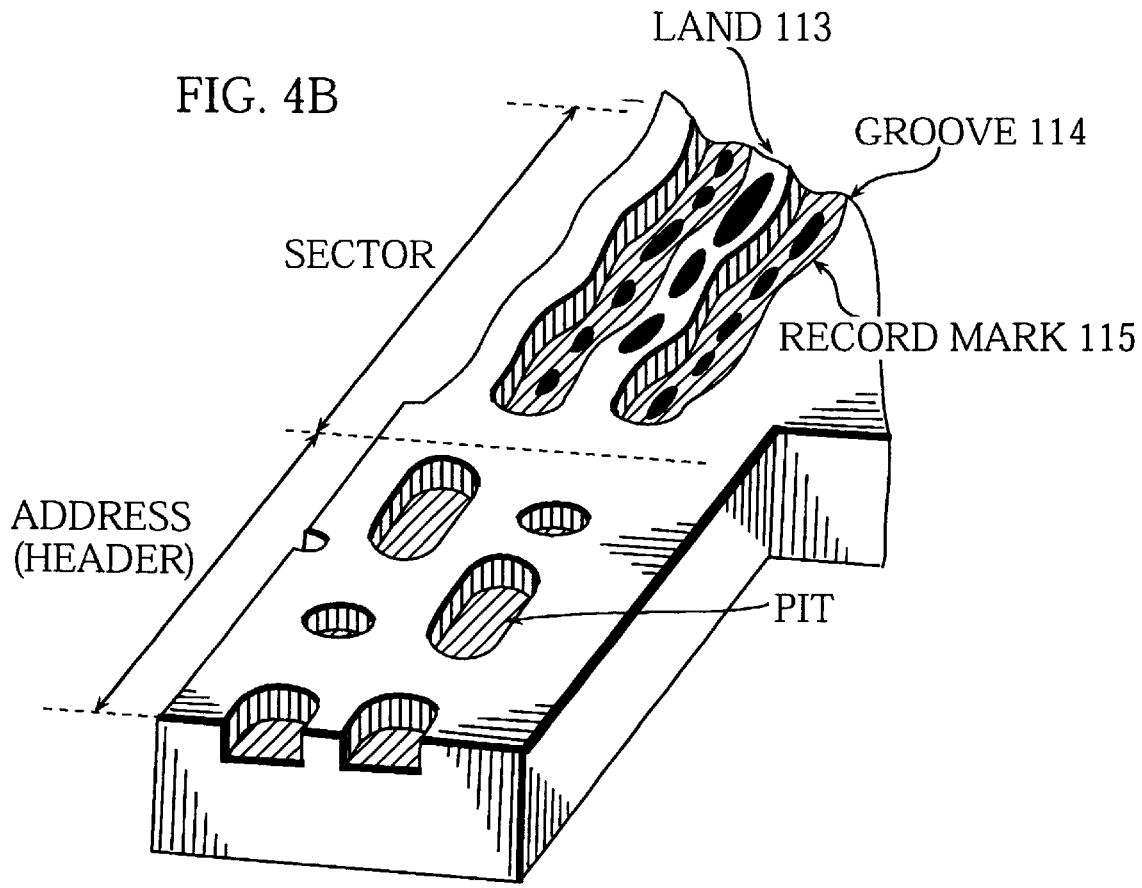
FIG. 4B shows the physical structure of the surface of the RAM information layer.

In addition to the series of pits, indented and protruding lands and grooves are formed on the surface of a reflective membrane such as a metal foil attached to the surface of the RAM information layer 109b. FIG. 4A shows shapes and sizes of pits on the header of the RAM information layer 109b, and FIG. 4B shows the physical structure of the surface of the RAM information layer 109b. As is the case with the ROM information layer 109a, the length of a pit ranges from 0.4 $\mu$m to 1.87 $\mu$m. The series of pits of the RAM information layer 109b is used for representing a sector address. The user data area and the error correction code storing area shown in FIG. 3C are respectively equivalent to a land 113 and a groove 114 which are indented and protruding parts. A record mark 115, which is made of an alloy membrane whose phase is changeable, is attached to the surface of the indented and protruding parts. Here, the phase change means that the state of the attached alloy membrane is changed from the crystal state to the non-crystal state by the light beam emission. In accordance with the phase change between the crystal state and the non-crystal state, information represented by 0 or 1 can be written on the record mark 115.

The bonding layer 110, being formed between the ROM information layer 109a and the RAM information layer 109b, bonds these layers and is made of resin such as a silicon resin.

Figure 5:
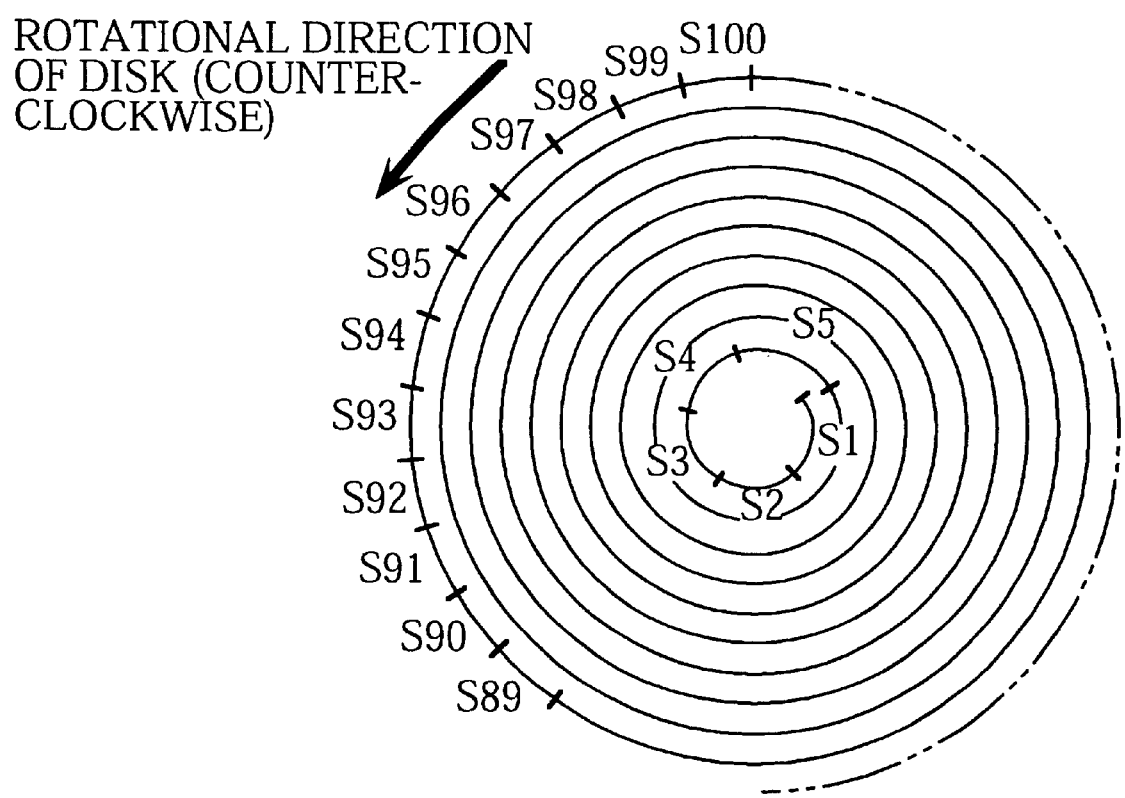
FIG. 5 shows a spiral track.

The physical sectors on the ROM information layer 109a and the RAM information layer 109b form a spiral track on the information layers from an inner circle toward the circumference. FIG. 5 is a representation showing the spiral track comprising a plurality of physical sectors. It should be noted here that the physical sectors referred to in the present specification are rounded rectangle areas formed on the spiral track and are the smallest units that secure the reliability of the data reading.

Figure 6:
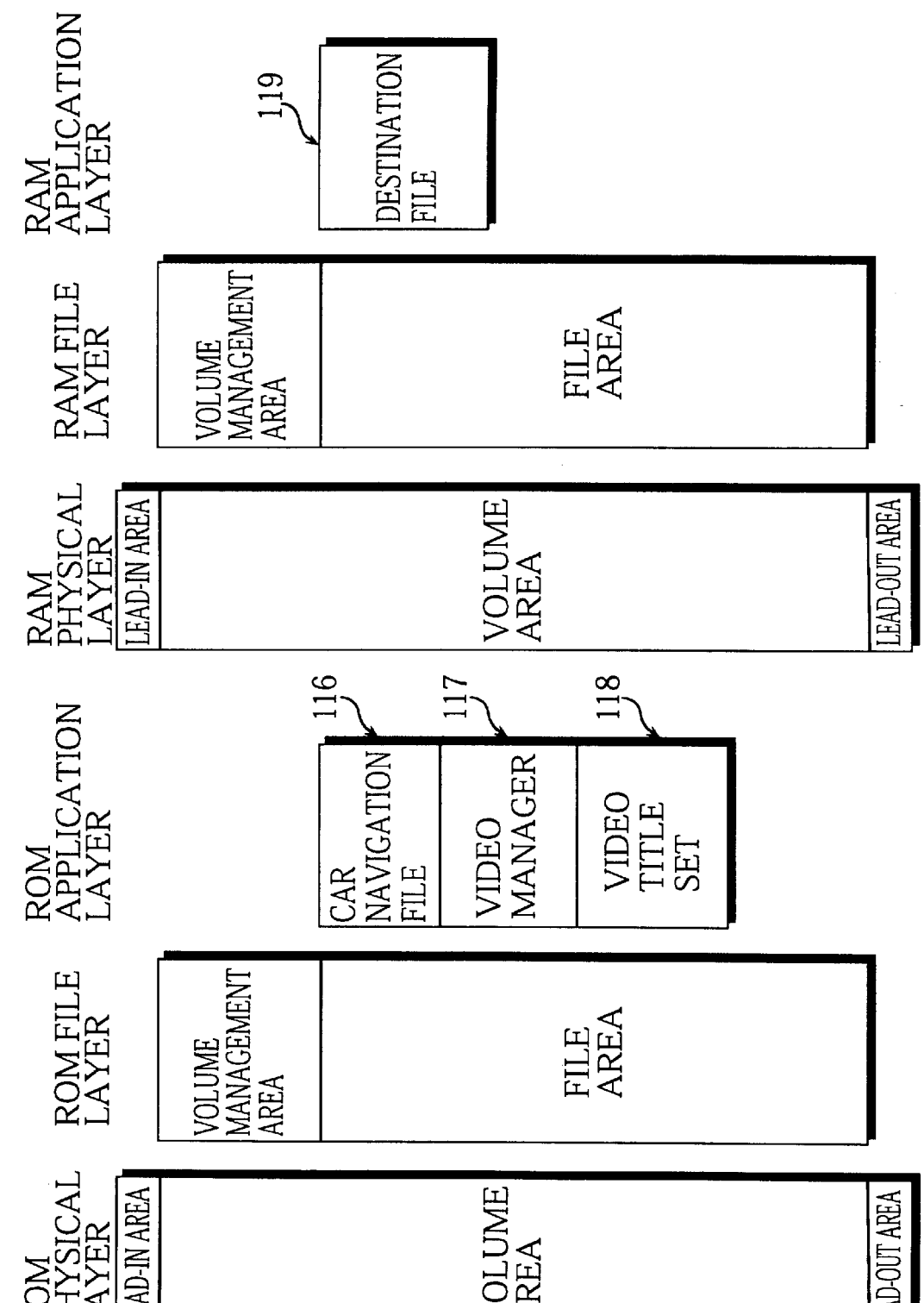
FIG. 6 shows logical constructions of layers on the optical disk.

The logical constructions of the ROM layer and the RAM layer are explained. Layer constructions of the ROM information layer 109a and the RAM information layer 109b are shown in FIG. 6. Each layer construction of the ROM layer and the RAM layer is composed of a physical layer having a logical construction for a firmware provided in the disk reproduction apparatus, a file layer having a logical construction of a file system, and an application layer for recording application software of the file system.

The physical layer having the logical construction for the firmware is first described. The firmware referred to here means a control program for controlling a mechanism including a spindle motor for driving the disk and an actuator of an optical pickup. The logical format of the innermost layer includes, from the top, a lead-in area, a volume area, and a lead-out area. These areas are recognized by identification information included in the sector address. The firmware refers to these areas and controls the spindle motor and the actuator of the pickup.

The lead-in area stores operation stabilization data which is used when the disk reproduction apparatus starts reading data from the optical disk. The lead-out area informs the disk reproduction apparatus of the end of reproduction and does not store meaningful data.

The volume area stores various data and manages the physical sector, as a logical block, to which the volume area belongs. The firmware identifies the logical blocks by their serial numbers, which are put to consecutive physical sectors with the first physical sector in the data recording area as number 0.

Next, the file layer and the application layer formed on the volume area are explained.

The file layer is divided into a volume management area and a file area. The volume management area stores the file system management information conforming to ISO13346, which is used to manage a plurality of logical blocks as files. The file system management information shows the relation between a plurality of file names and addresses of groups of logical blocks. The disk reproduction apparatus achieves the disk access in units of files by using the file system management information. More specifically, if a file name is given, the disk reproduction apparatus refers to all the file system management information to calculate all the groups of logical blocks for the file, and accesses the groups of logical blocks to fetch a desired piece of digital data.

As described later in this specification, the application file includes two file types respectively used by an in-car disk reproduction apparatus (referred to as "in-car player" hereinafter) and a non-in-car disk reproduction apparatus (referred to as the "non-in-car player" hereinafter). The file system management information is referred when each of these disk reproduction apparatuses determines the file that it should use.

The logical construction of the application layer is explained. The application layer of the ROM information layer 109a stores a car navigation file 116 (also called a "car navigation standard part") used by the in-car player and also stores a video manager 117 and a video title set 118 (these two are called "video standard parts") used by the non-in-car player. The application layer of the RAM information layer 109b can store a destination file 119 including a plurality of pieces of destination information as position information of the destination. The destination file 119 is referred by the in-car player.

Figure 7:
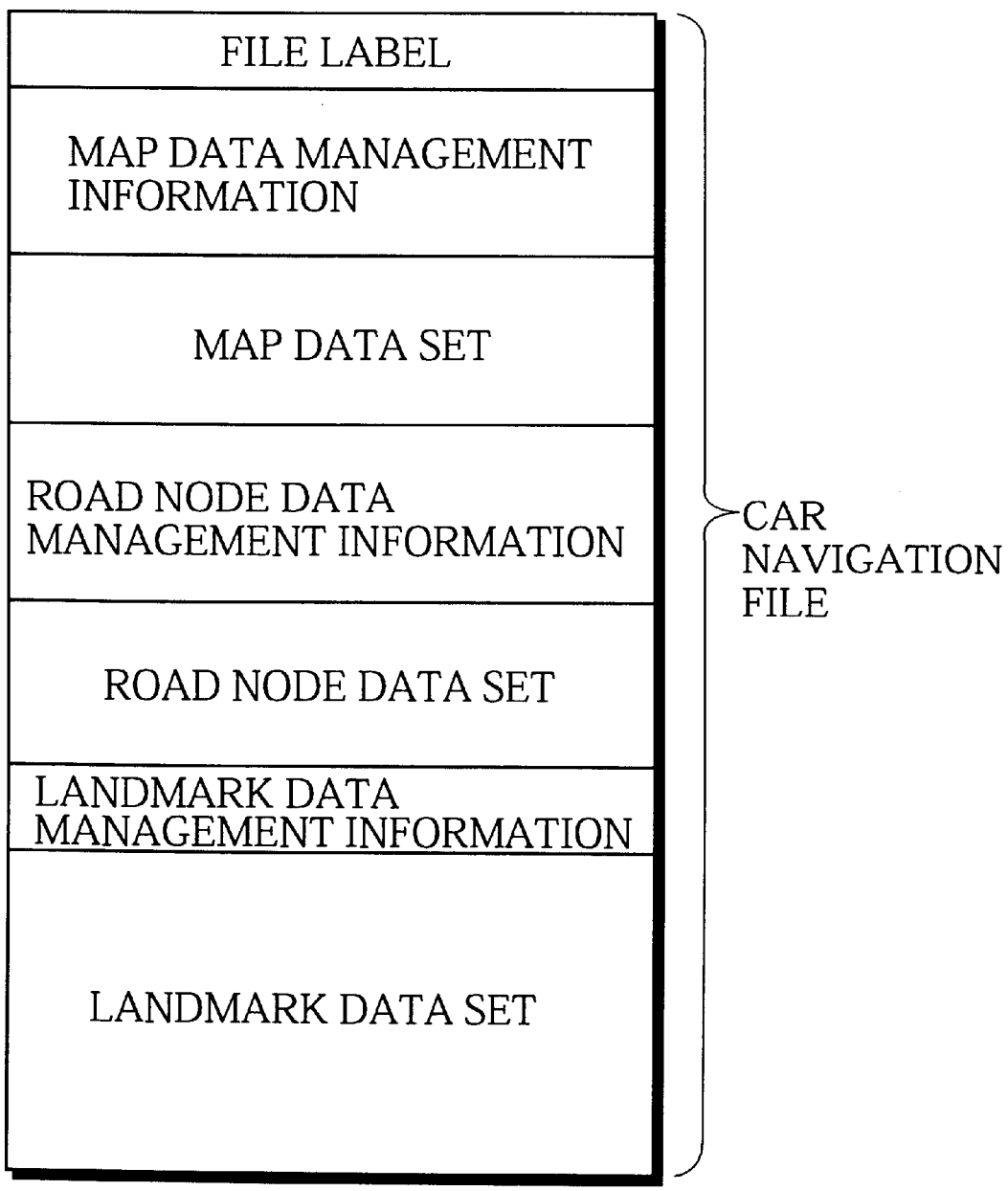
FIG. 7 shows a data format of a car navigation file.

The car navigation file 116 stores various data used by the in-car player, that is, a car navigation apparatus provided in a car. FIG. 7 shows an example of a data format of the car navigation file 116.

As shown in FIG. 7, the car navigation file 116 is composed of a file label, map data management information, a map data set, road node data management information, a road node data set, landmark data management information, and a landmark data set.

The file label includes a version name, a name of the creator, and the creation date of the car navigation file 116.

The map data management information includes an address for each piece of map data stored in the map data set and the scale of the map data.

The map data set includes a plurality of pieces of map data.

The road node data management information includes an address for each road node data stored in the road node set and the scale of the road node.

The road node data set includes a plurality of pieces of map data.

The landmark data management information includes an address for each piece of landmark data stored in the landmark data set and the scale of the landmark.

The landmark data set includes a plurality of pieces of land mark data.

The following is a description as to what the map data, the road node data, and the landmark data respectively represent. With reference to FIG. 9, the concept of map data stored in the two-layer DVD 107 is explained, and subjects in practice which are represented by the map data, the road node data, and the landmark data are described.

In FIG. 9, a coordinate system 2m indicates a topography m1 stored as a map on a scale m4, and a coordinate system 3m indicates the topography m1 on a scale m5 (m5>m4). Each frame in these coordinate systems is subjected to the map data.

In the coordinate system m2, districts A, B, C, D, E, F, G, H, and I corresponding to nine sections are respectively indicated as one piece of map data. Meanwhile, in the coordinate system m3, districts 1, 2, 3, and 4 corresponding to four sections are respectively indicated as one piece of map data.

The map data indicating the same district in a plurality of coordinate systems has a hierarchical relationship. As one example, the map data 1, 2, 3, and 4 respectively indicate the northeast, northwest, southeast, and southwest of the map data I. The map data I shown in FIG. 9 is on the upper layer of the map data 1, 2, 3, and 4. That is, the map data 1, 2, 3, and 4 is on the lower layer of the map data I.

Figure 10:
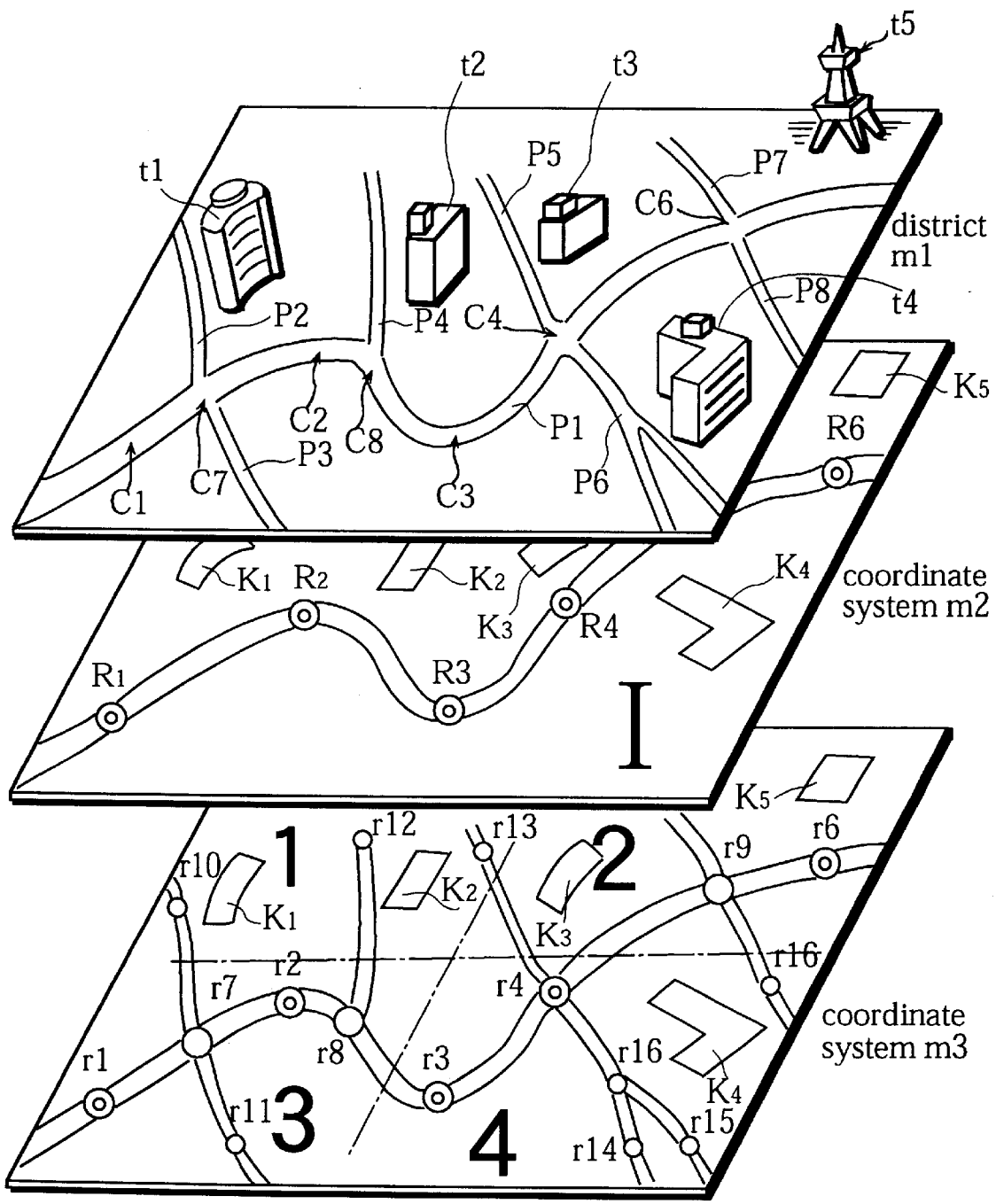
FIG. 10 shows representations of the road node data and the landmark data.

FIG. 10 shows contents of the map data I and the map data 1, 2, 3, and 4.

A national road P1 runs from the east to the west in the center of the district I, and municipal roads P2, P3, P4, P7, and P8 also runs. Moreover, constructions t1, t2, t3, t4, and t5 are located in the district I.

Subjects of the landmark data are constructions and facilities which can be landmarks when visiting the district, such as famous tourist spots, government offices, and medical facilities. Subjects of the road node data are intersections on the national road and the municipal roads, and each road node indicates routes to which the national road or the municipal road branches. For example, in the coordinate system m2, the national road P1 is presented by road nodes R1, R2, R3, R4, and R6 corresponding to intersections C1, C2, C3, C4, and C6. The constructions t1, t2, t3, t4, and t5 are presented by landmarks K1, K2, K3, K4, and K5.

Meanwhile, in the coordinate system m3, the national road P1 is presented by road nodes r1, r2, r3, r4, and r6, and the constructions t1, t2, t3, t4, and t5 are presented by the landmarks K1, K2, K3, K4, and K5. A municipal road P2 is presented by road nodes r7 and r10, and a municipal road P3 is presented by road nodes r7 and r11.

A municipal road P4 is presented by road nodes r8 and r12, and a municipal road P6 is presented by road nodes r14, r15, and r16.

According to this concept, the data format of the map data for showing the map is defined as shown in FIG. 8A.

"Upper left longitude," "upper left latitude," "lower right longitude," and "lower right latitude" respectively indicate a position of the district associated with the map data in the coordinate system ml.

"Link information to northwest of 8-neighbor map data" indicates information of a neighboring district in the northwest direction.

"Link information to north of 8-neighbor map data" indicates information of a neighboring district in the north direction.

"Link information to northeast of 8-neighbor map data" indicates information of a neighboring district in the northeast direction.

"Link information to east of 8-neighbor map data" indicates information of a neighboring district in the east direction.

"Link information to southeast of 8-neighbor map data" indicates information of a neighboring district in the southeast direction.

"Link information to south of 8-neighbor map data" indicates information of a neighboring district in the south direction.

"Link information to southwest of 8-neighbor map data" indicates information of a neighboring district in the southwest direction.

"Link information to west of 8-neighbor map data" indicates information of a neighboring district in the west direction.

"Link information to map image data" indicates an address of the image data showing an overlook of the district corresponding to the current map data.

"Link information to upper scale map data" indicates, when the current road node has a road node on the upper scale, an address of the road node.

"Link information to lower scale map data showing details of northeast" indicates, when the current road node has a road node on the lower scale showing the details of the northeast part, an address of the road node.

"Link information to lower scale map data showing details of northwest" indicates, when the current road node has a road node on the lower scale showing the details of the northwest part, an address of the road node.

"Link information to lower scale map data showing details of southeast" indicates, when the current road node has a road node on the lower scale showing the details of the southeast part, an address of the road node.

"Link information to lower scale map data showing details of southwest" indicates, when the current road node has a road node on the lower scale showing the details of the southwest part, an address of the road node.

"Link information to landmark data" indicates, when landmarks should be arranged on the image data indicated by the "link information to map image data," addresses of the landmarks.

"Link information to road node data" indicates, when road nodes should be arranged on the image data indicated by the "link information to map image data", an address of a road node link table which shows addresses of the road nodes.

By means of this format, map data of neighboring districts in a coordinate system can be clearly indicated. Meanwhile, the map data can clearly indicate map data stored in the upper coordinate system and the lower coordinate system. Also, the landmarks and the road nodes in the coordinate system can be indicated.

A data format of road node data for indicating a road according to the stated concept is defined as shown in FIG. 8B.

"Latitude and longitude of road node" indicates the latitude and longitude of an intersection associated with the road node.

"Road type information" indicates a type of a road on which the intersection associated with the road node is located. More specifically, the "road type information" indicates a road width, the number of lanes, and national road information.

"Link information to road node of lower scale map" indicates, when the current road has a road node on the lower scale, an address of the road node.

"Link information to road node of upper scale map" indicates, when the current road node has a road node on the upper scale, an address of the road node.

"Number of neighboring nodes" indicates, when the current road node has at least one neighboring road node, the total number of the neighboring road nodes.

"Link information to neighboring node×number of nodes" indicates, when the current road node had at least one neighboring road node, all addresses of the road nodes.

A data format of the landmark data is defined as shown in FIG. 8C.

"Latitude and longitude of landmark" indicates the latitude and longitude of a construction associated with the landmark.

"Landmark type" indicates a type of a construction associated with the landmark. More specifically, the "landmark type" indicates what the construction is, namely, whether it is an amusement park, a hospital, or the like.

The following is a description as to how the districts I, 1, 2, 3, and 4 given as examples in FIG. 10 are converted into data according to the formats shown in FIGS. 8A, 8B, and 8C.

Figure 11:
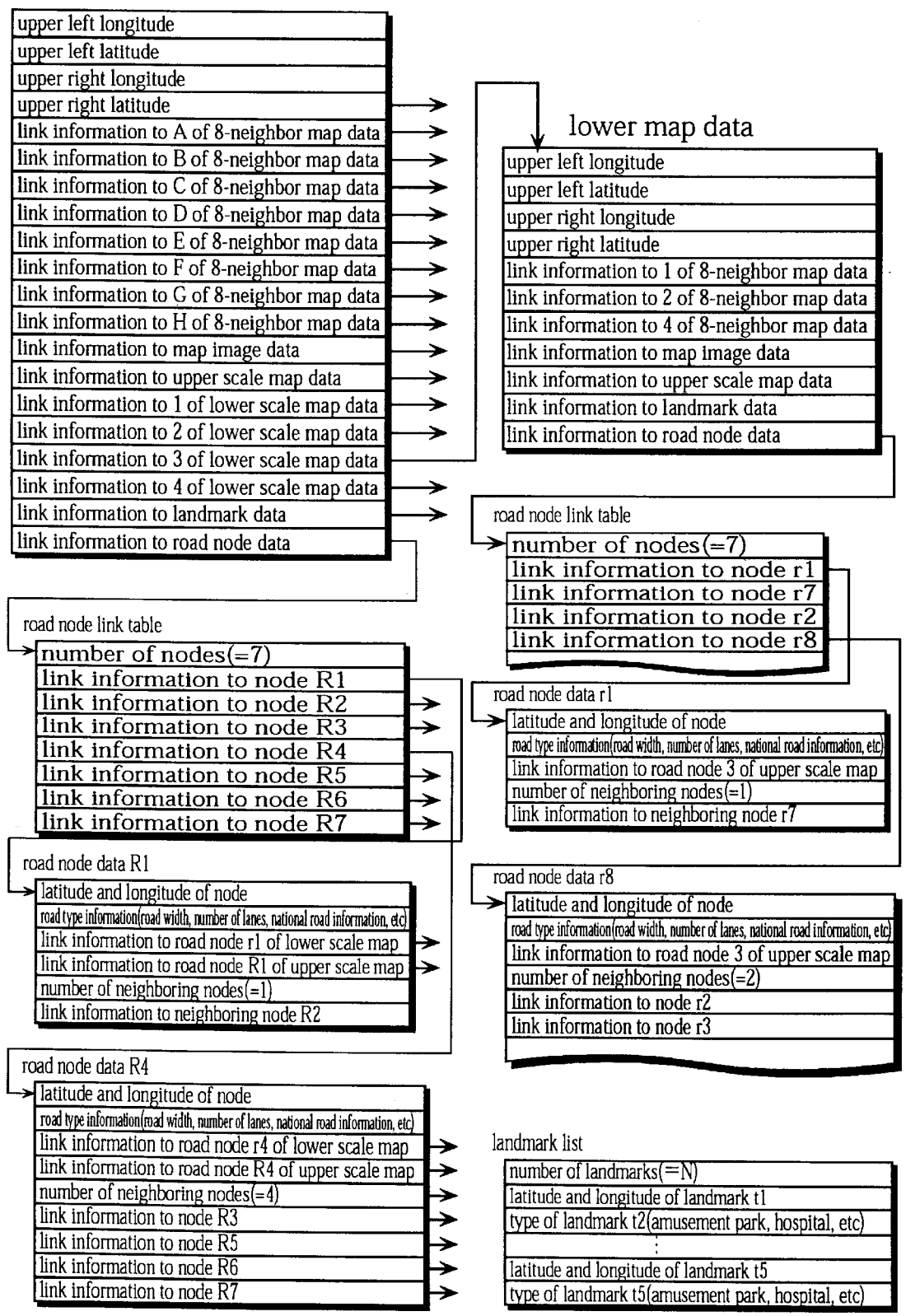
FIG. 11 shows how a plurality of pieces of map data are linked by link information.

FIG. 11 shows map data of the districts I, 1, 2, 3, and 4, the landmark data, and the road node data. Each link information to 8-neighbor map data of the map data for the district I indicates link information to a map data address of the corresponding district A, B, C, D, E, F, G, or H. Each link information to lower scale map data indicates link information to the map data of the corresponding district 1, 2, 3, or 4. "Link information to road node data" indicates the address of the road node link table which includes link information to the road nodes R1, R2, R3, R4, R5, R6, and R7.

"Link information to neighboring node×number of nodes" of the road node data R1 includes link information to the road node R2, and "link information to neighboring node×number of nodes" of the road node R4 includes link information to the road nodes R3, R5, R6, and R7.

"Link information to upper scale map data" in the map data of the district 3 indicates link information to a map data address of the district I. "Link information to lower scale map data" in the map data of the district I indicates link information to map data addresses of the districts 1, 2, and 4. "Link information to road node data" in the map data of the district I indicates the address of the road node link table which includes link information to the road nodes r1, r2, r7, and r8.

"Link information to neighboring node×number of nodes" of the road node data r1 includes link information to the road node r7, and "link information to neighboring node×number of nodes" of the road node data r8 includes link information to the road nodes r2 and r4.

The landmarks of the constructions t1, t2, t3, t4, and t5 are listed in a landmark list as shown in FIG. 11.

Next, the video title set 118 and the video manager 117 are explained, both of which are application files used by the non-in-car player.

The video title set 118 shown in FIG. 6 is a file that includes a plurality of video titles used for visually introducing the tourist spots, government offices, and medical facilities associated with the landmark data included in the car navigation file 116. Here, these video titles are shown using moving pictures. The video title set 118 includes three video titles for each introducing a tourist spot in the district I. A video title 1 is used for introducing the Osaka Tower, a video title 2 is for the Osaka Dome, and a video title 3 is for the Osaka Aquarium.

The video manager 117 shown in FIG. 6 displays a menu (or, a volume menu) presenting the plurality of video titles included in the video title set 118, and is a file used for reproducing one of the video titles which is selected on the volume menu via a determination operation performed by the user.

FIG. 12 shows an example of the volume menu included in the video manager 117. As shown in this drawing, three video titles corresponding to three tourist spots are presented.

Figure 13:
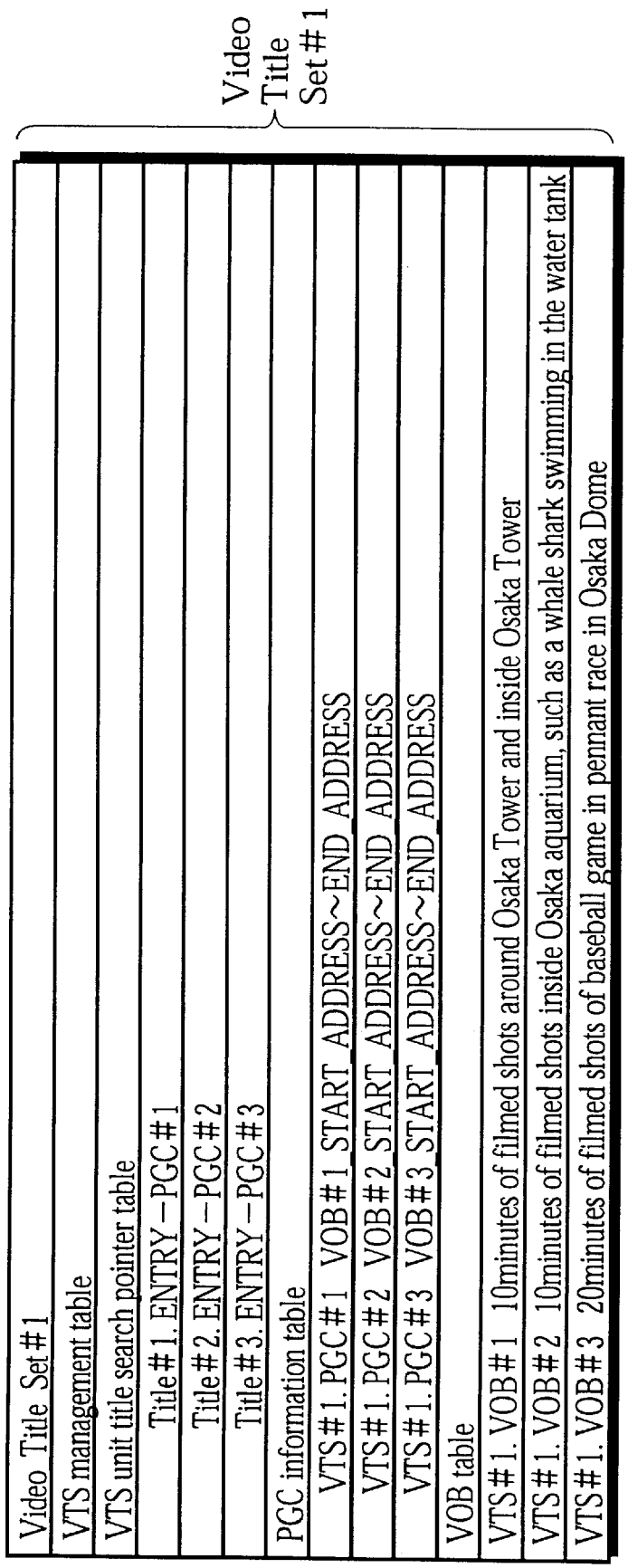
FIG. 13 is an example of a video title set.

The following is a description of the construction of the video title set 118. FIG. 13 is a data format of the video title set 118. As shown in FIG. 13, the video title set 118 includes a VTS (Video Title Set) management table, a VTS unit title search pointer table, a PGC (Program Chain) information table, and a VOB (Video Object) table.

The VTS management table is header information of the video title set 118 and stores pointers for storage positions of the VTS unit title search pointer table and the PGC information table.

The VOB table includes a plurality of VOBs which are useable when one of the plurality of video titles included in the video title set 118 is reproduced. The VOB referred to here is a so-called an "MPEG stream" in which various variable-length stream data, such as moving picture data, audio data, sub-picture data, and management information, are multiplexed, and is a unit used as one scene of a movie in a DVD. After inverse quantization processing and inverse discrete cosine transformation processing, the moving picture data is displayed as video images according to motion compensation prediction based on a motion vector. The sub-picture data is image data compressed according to run-length coding, and the audio data is digital sound by the linear PCM method or the Dolby AC-3 method.

The moving picture data multiplexed in a VOB#1 stored in the VOB table shows filmed shots around the Osaka Tower and inside the Osaka Tower. The moving picture data multiplexed in a VOB#2 stored in the VOB table shows filmed shots in the Osaka Aquarium, the filmed shots including a whale shark swimming in the water tank. The moving picture data multiplexed in a VOB#3 shows filmed shots of a baseball game of a pennant race in the Osaka Dome.

Figure 15:
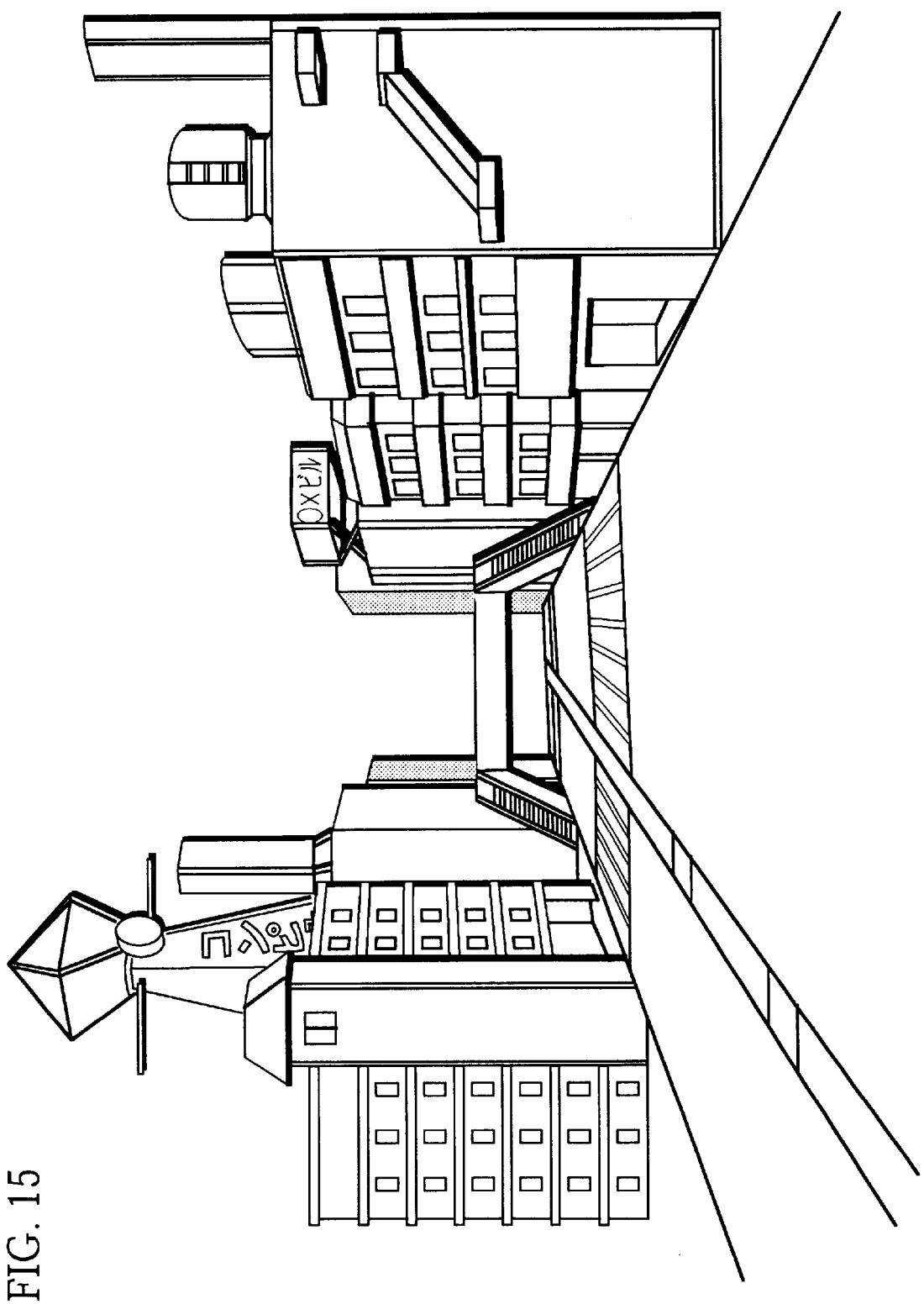
FIG. 15 shows a content of moving picture data which is multiplexed in a VOB.

FIG. 15 shows an example of the video image multiplexed in the VOB#1. As shown in this drawing, the Osaka Tower, one of the symbols in Osaka, is shown at the upper left corner. As described above, the landmark data stored in the car navigation file 116 represents the tourist spots and the constructions as K1, K2, K3, K4, and K5. As such, the displayed image gives a restrained impression in design. By means of the VOB table, on the other hand, the same tourist spots and the constructions as stored in the car navigation file 116 are displayed using the filmed shots in high picture quality. The construction t5 associated with the Osaka Tower is inorganically represented by the rectangle form K5 in the landmark data. By means of the VOB, meanwhile, the Osaka Tower is lively represented using the filmed shots.

The audio data multiplexed in the VOB#1 includes light background music and a narration explaining about the corresponding tourist spot, i.e., the Osaka Tower. The narration ends with "Now, the introduction of the Osaka Tower is finished. Do you set the Osaka Tower as your destination?" FIG. 16B shows an example of a bitmap multiplexed in the sub-picture data. This sub-picture data includes data of character strings "Naniwa Ward of Osaka City: Periphery of Osaka Tower Set As Your Destination?" shown in FIG. 16B, with the data being compressed with run length coding. This bitmap is displayed at the end of the reproduction of the moving picture data.

The PGC information table indicates a start address and an end address of a VOB included in the VOB table when one of the video titles is reproduced, and also controls valid reproduction during the reading of the video title.

The VTS unit search pointer table specifies PGC information stored in the PGC information table, that is required for the reproduction of the video title.

The following is a description as to how each VOB is multiplexed.

FIG. 14 shows the construction of the VOB. As shown in FIG. 14, a VOB includes a plurality of VOB units aligned in time series. In a VOB unit (indicated as "VOBU" in the drawing), pieces of variable-length compressed data which can be reproduced together in a time period ranging from about 0.5 to 1.0 seconds are multiplexed.

The pieces of variable-length compressed data which can be multiplexed in the VOB unit include moving picture data, a plurality of channels of audio data, and a plurality of channels of sub-picture data. These pieces of data multiplexed in the VOB unit are respectively referred to as a video pack, an audio pack, and a sub-picture pack. Each data pack has 2 KB of data.

The plurality of VOB units in the VOB are arranged in time sequence. However, all data packs in a VOB unit can be arranged irregularly, except the management information pack which should be placed at the first position. Also the total number of packs in a VOB unit and the number of packs for each type may not be the same. More specifically, a VOB unit may include audio data, sub-picture data, and moving picture data in this order, or may include sub-picture data, moving picture data, and audio data in this order. Alternatively, a VOB unit may include three or five hundreds of video packs.

All data packs except for the management information pack can be irregularly arranged since the reproduction apparatus fetches these packs after storing them in buffers. This is to say, they do not need to be arranged in a certain order. Each VOB unit has the number of packs different from each other since the data is encoded according to the variable-length coding and the amount of data is considerably different for each VOB unit even if the data can be reproduced in the time period ranging from about 0.5 to 1.0 seconds.

Decoders in the disk reproduction apparatus need to be controlled to inform the disk reproduction apparatus of the data amount to be transferred in a reproduction unit of about 0.5 seconds before the reproduction of about 0.5 seconds starts, so that the disk reproduction apparatus realizes decode processing in accordance with the informed data amount. For this reason, the management information pack is arranged before all the variable-length compressed data in the VOB unit so that the variable-length compressed data can be uniformly reproduced in a certain period of time, such as about 0.5 seconds. The management information includes a transfer rate for the whole VOB unit, transfer rates for the moving picture stream, audio stream, sub-picture stream, and a buffer size.

One of a plurality of management information packs placed at the first position of the VOB unit may include information for indicating the control associated with the bitmap displayed using the sub-picture data to the disk reproduction apparatus.

The information used for indicating the control associated with the bitmap to the disk reproduction apparatus is referred to as the "highlight information". FIG. 16A shows highlight information example. As shown in this drawing, the highlight information includes coordinate information for indicating a range to be converted and color information for specifying a color and a mixture ratio when the user selects or determines the bitmap as an item, and also includes a highlight command which the disk reproduction apparatus executes after the item displayed using the sub-picture data is selected by the user. In this way, since the management information pack includes the command executed by the disk reproduction apparatus when the item is selected by the user, the object of the VOB is not limited to displaying the moving pictures. Specifically, the disk reproduction apparatus executes the highlight command, so that interactive reproduction is realized.

As shown in FIG. 16A, "longitude#m1" specified in the first operand of the highlight command "SetwriteRAM longitude#m1, latitude#n1" indicates the longitude of the tourist spot introduced using the moving picture data included in the VOB which includes the current management information pack. Meanwhile, "latitude#n1" specified in the second operand indicates the latitude of the tourist spot introduced using the moving picture data included in the VOB which includes the current management information pack, and "SetWriteRAM" specified as an operation code indicates that the longitude and the latitude specified in the first and second operands are written in the destination file 119 of the RAM information layer 109b of the two-layer DVD 107.

Accordingly, the interactive reproduction using the highlight command "SetWriteRAM" is achieved by writing the longitude and latitude in accordance with the user operations. The writing of the longitude and latitude can be performed while the moving picture data introducing the tourist spot is being displayed. As such, the user can easily perform the writing operation on the two-layer DVD 107, enjoying the filmed shots introducing the moving picture data.

In addition, the user can decide which tourist spot to visit or not to visit by watching the plurality of the video titles and listening to the narrations concerning the tourist spots.

Next, the disk reproduction apparatus as the non-in-car player is explained. FIG. 17 shows an audio/visual environment for the video titles, with a consumer AV disk reproduction apparatus (referred to as the "DVD player" hereinafter) being the central component. The audio/visual environment includes a DVD player 1, a TV monitor 2, and a remote controller 91.

The DVD player 1 reproduces the video titles recorded on the two-layer DVD 107. More specifically, VOBs recorded on the DVD are converted to NTSC (National Television System Committee) or PAL (Phase Alternating by Line) signals. Here, this signal conversion means the video title reproduction since the NTSC signals and the PAL signals are based on the international standards of the television signals. Therefore, the conversion from the VOBs recorded on the DVD to the NTSC signals or the PAL signals means that the video titles are displayed on a monitor for TV broadcast that has become widespread in the world.

The DVD player 1 has a slot on the front side and a disk drive in the rear direction of the slot for setting the two-layer DVD 107.

On the back side of the DVD player 1, a video output terminal and an audio output terminal are set. Through AV cords connected to the terminals, the NTSC or the PAL signals (referred to as the "image signals" hereinafter) reproduced by the DVD player 1 can be outputted to the TV monitor 2.

The remote controller 91 receives user operations.

Figure 18:
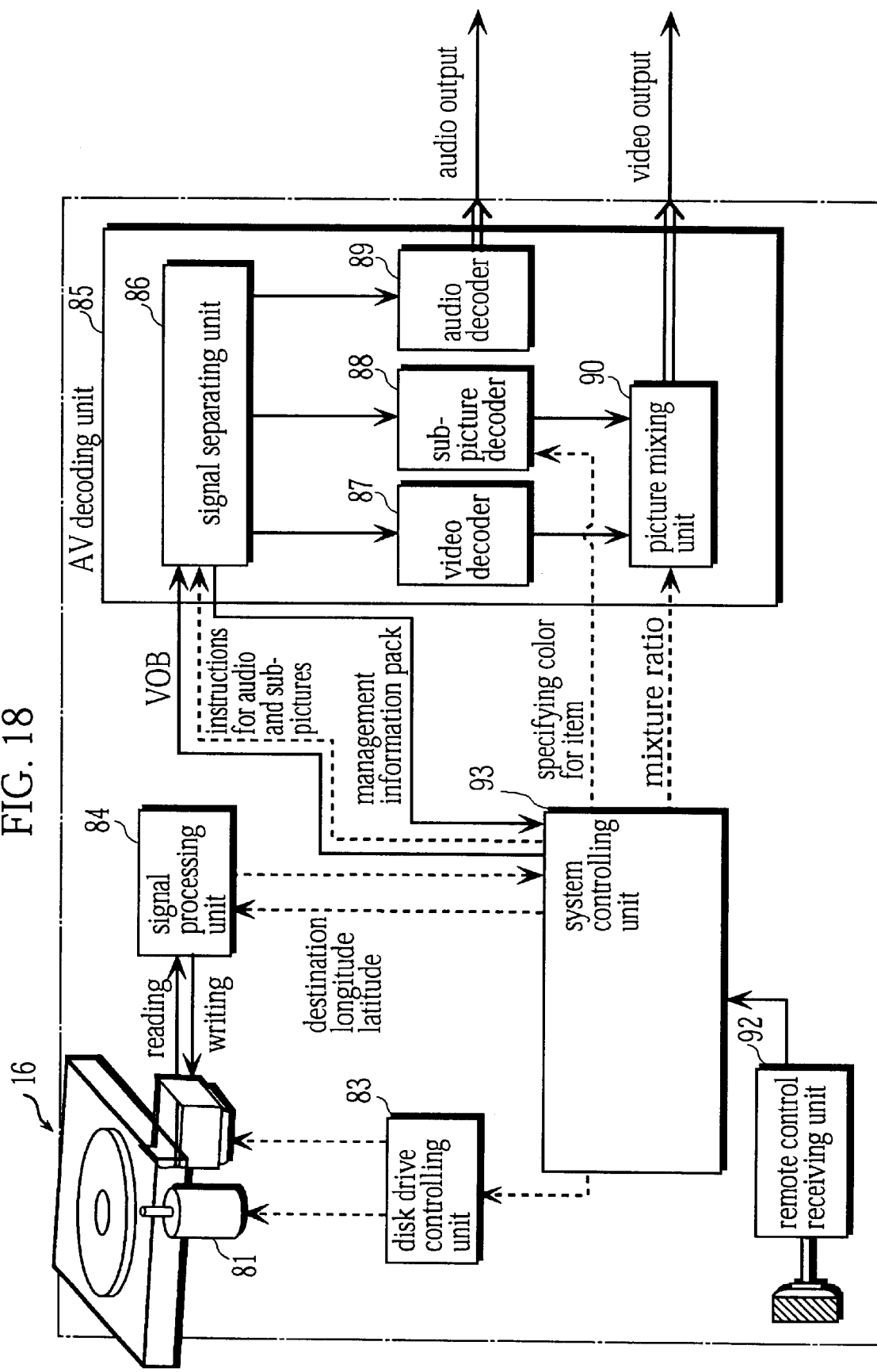
FIG. 18 is a block diagram showing the construction of a DVD player.

FIG. 18 is a block diagram showing the construction of the DVD player 1 used in the present embodiment. The DVD player 1 is composed of a disk drive 16, an optical pickup, a disk drive controlling unit 83, a signal processing unit 84, an AV decoding unit 85, a remote control receiving unit 92, and a system controlling unit 93. The AV decoding unit 85 includes a signal separating unit 86, a video decoder 87, a sub-picture decoder 88, an audio decoder 89, and a picture mixing unit 90.

The disk drive 16 includes a board on which the two-layer DVD 107 is set and a spindle motor 81 for clamping and rotating the two-layer DVD 107. The board moves in and out of the cubic space by means of an eject mechanism which is not shown in the drawing. The user places the two-layer DVD 107 on the board ejected outside the DVD player 1. Then, the board moves into the DVD player 1, loading the two-layer DVD 107.

The disk drive controlling unit 83 controls the spindle motor 81 for rotating the disk and also controls the mechanism including the optical pickup for reading the image signals recorded on the disk and an actuator of the optical pickup. Specifically, the disk drive controlling unit 83 adjusts the motor speed according to a track position specified by the system controlling unit 93, moves the optical pickup by controlling the actuator, then after a correct track is detected by servo control, waits for a desired physical sector and reads signals continuously starting from desired position. The disk drive controlling unit 83 can have the optical pickup access the ROM information layer 109a and the RAM information layer 109b. Moreover, the disk drive controlling unit 83 can increase the intensity of the optical beam when accessing the RAM information layer 109b, so that information can be written in the RAM information layer 109b by changing the phase of the land on the surface of the RAM information layer 109b.

The signal processing unit 84 converts the signals read through the optical pickup into digital data by processing the signals with amplification, waveform shaping, binarization, demodulation, error correction, etc., and then stores the processed data in a buffer memory of the system controlling unit 93 in units of logical blocks.

The AV decoding unit 85 converts VOBs of digital data into the video signals and audio signals.

The signal separating unit 86 receives the digital data transferred from the buffer memory in units of logical blocks (packets), and classifies the data into the moving picture data, sub-picture data, audio data, and management information pack by identifying the stream ID and sub-stream ID in the header of each packet. The signal separating unit 86 outputs the moving picture data to the video decoder 87, the audio data to the audio decoder 89, the sub-picture data to the sub-picture decoder 88, and the management information pack to the system controlling unit 93.

The picture mixing unit 90 outputs video signals after mixing the outputs from video decoder 87 and the sub-picture decoder 88 according to the ratio specified by the system controlling unit 93.

The system controlling unit 93 is composed of a program memory for storing programs to realize functions of the system controlling unit 93, a work memory required for the program execution, a buffer memory for storing the data of the disk in units of logical blocks, a CPU for executing the programs, and an interface controlling unit for inputting and outputting the data and control signals. With this construction, the system controlling unit 93 controls the entire disk reproduction apparatus.

Figure 19:
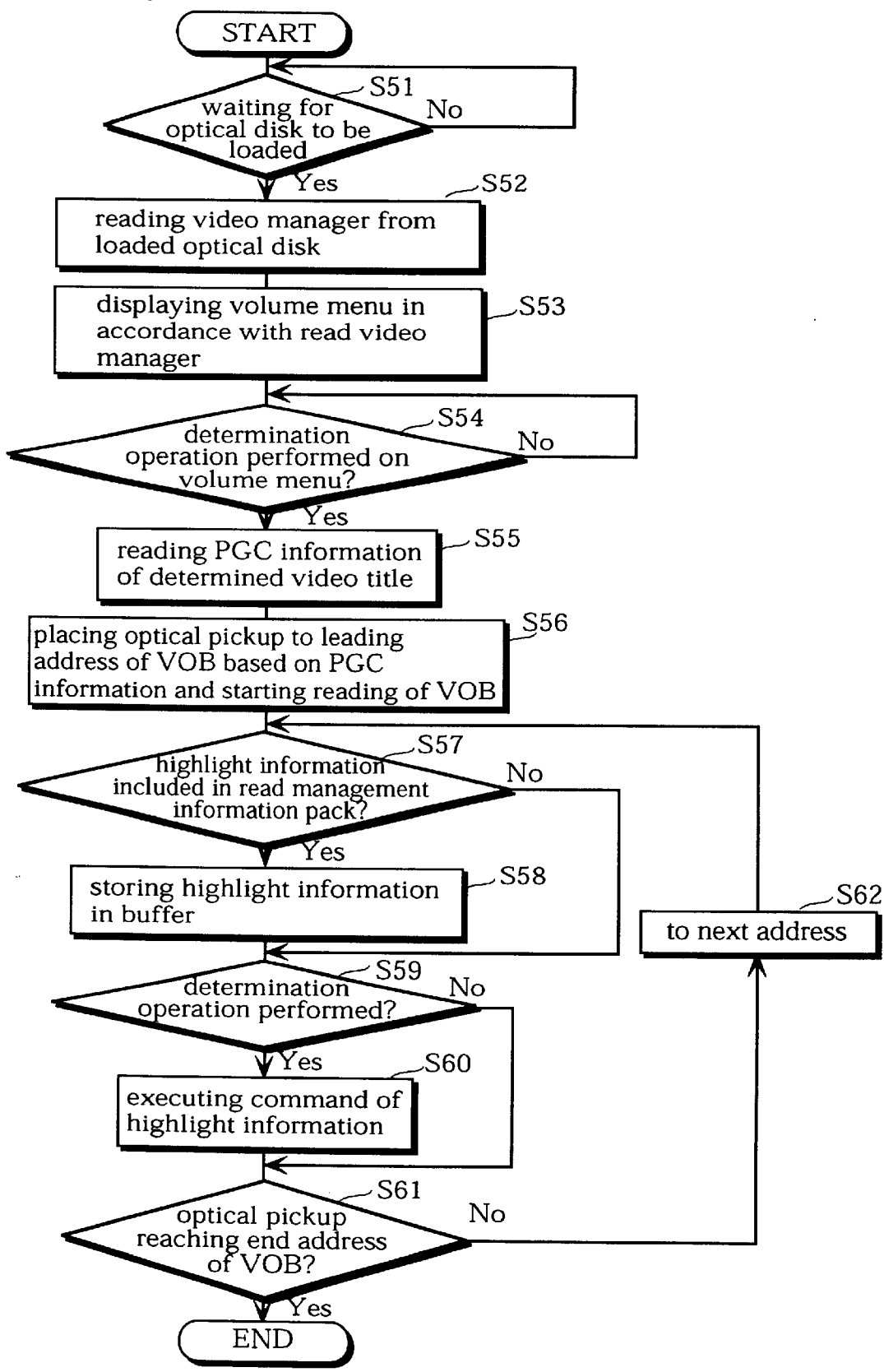
FIG. 19 is a main flowchart showing processing performed by a system controlling unit.

FIG. 19 is a flowchart showing the processing performed by the system controlling unit 93. The operation of the DVD player 1 is described, with reference to this flowchart of FIG. 19.

Figure 20:
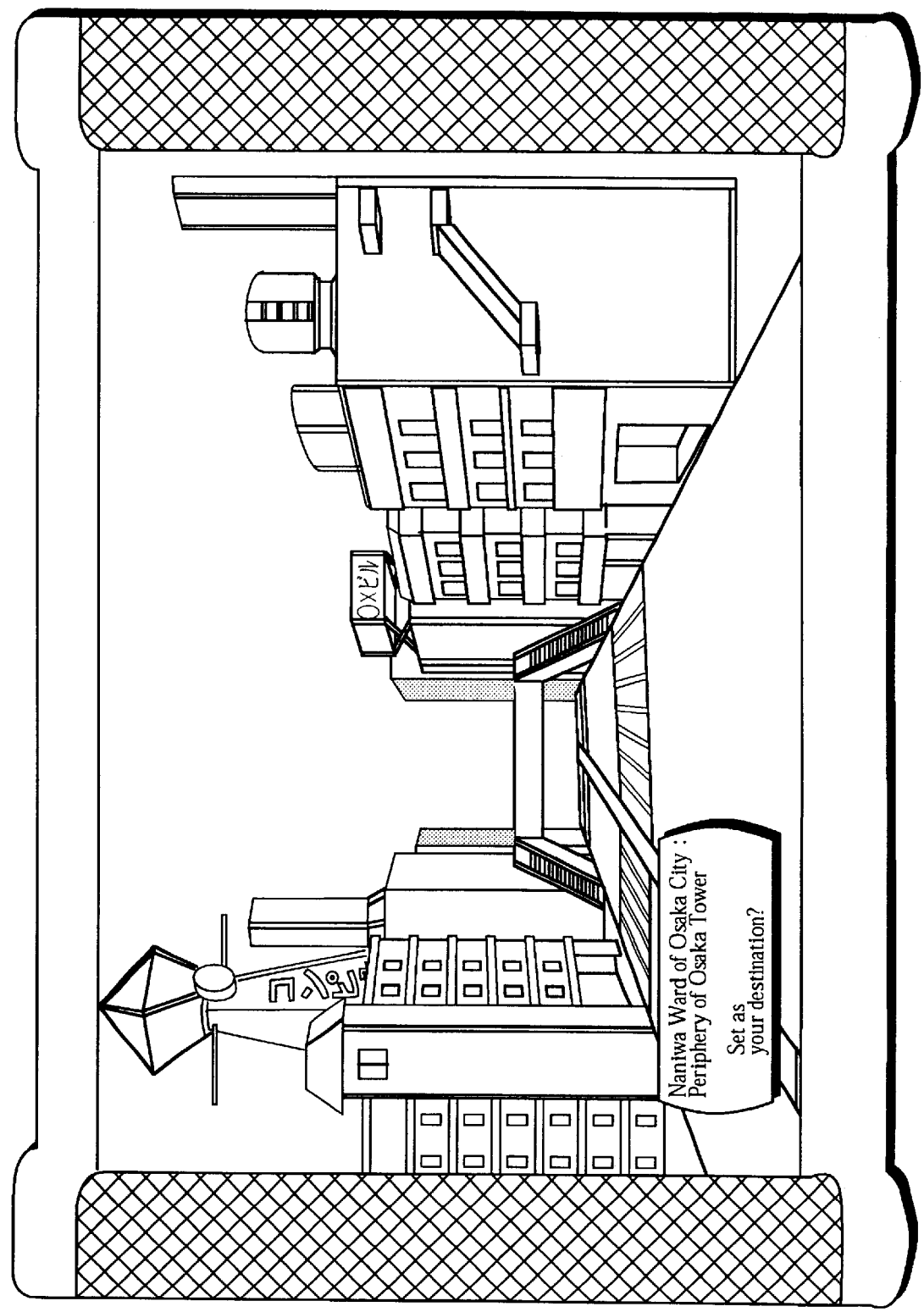
FIG. 20 is a display example displayed on a TV monitor.

When the DVD player 1 is turned on, the system controlling unit 93 is in a wait state judging whether the two-layer DVD disk has been inserted (step S51). The system controlling unit 93 reads the video manager 117 (step S52), and has the volume menu displayed in accordance with the video manager 117 (step S53). Then, the system controlling unit 93 judges whether the determination operation is performed on the volume menu (step S54), and, if so ("Yes" in step S54), reads the PGC information corresponding to the video title (step S55). The system controlling unit 93 places the optical pickup to the leading address of the VOB in accordance with the PGC information and starts reading the VOB (step S56). As the VOB is read, a superimposed image (shown in FIG. 20) of the filmed shot shown in FIG. 15 and the bitmap shown in FIG. 16B is displayed on the TV monitor 2.

The system controlling unit 93 judges whether the highlight information is included in the management information pack of the read VOB (step S57). If so, the system controlling unit 93 stores the highlight information in the buffer (step S58). After storing the highlight information, the system controlling unit 93 judges whether the determination operation is performed (step S59), and, if so, executes the highlight command of the highlight information (step S60).

When the highlight command is "SetWriteRAM longitude#m1, latitude#n1", the system controlling unit 93 performs the predetermined signal processing on "longitude#m1" specified in the first operand and "latitude#n1" specified in the second operand, and moves the optical pickup to access the spiral track on the surface of the RAM information layer 109b. By increasing the output from the optical pickup, the system controlling unit 93 has the longitude and the latitude specified in the highlight command written in the destination file 119 as one element.

After this, the system controlling unit 93 judges whether the optical pickup reaches the end address of the VOB specified in the PGC information (step S61). If not, the system controlling unit 93 advances the optical pickup to the next address (step S62) and performs the processing starting from step S57. If the processing from step S57 to step S62 has been performed on the all addresses of the VOB, this means that the reproduction of the VOB is finished.

Figure 21:
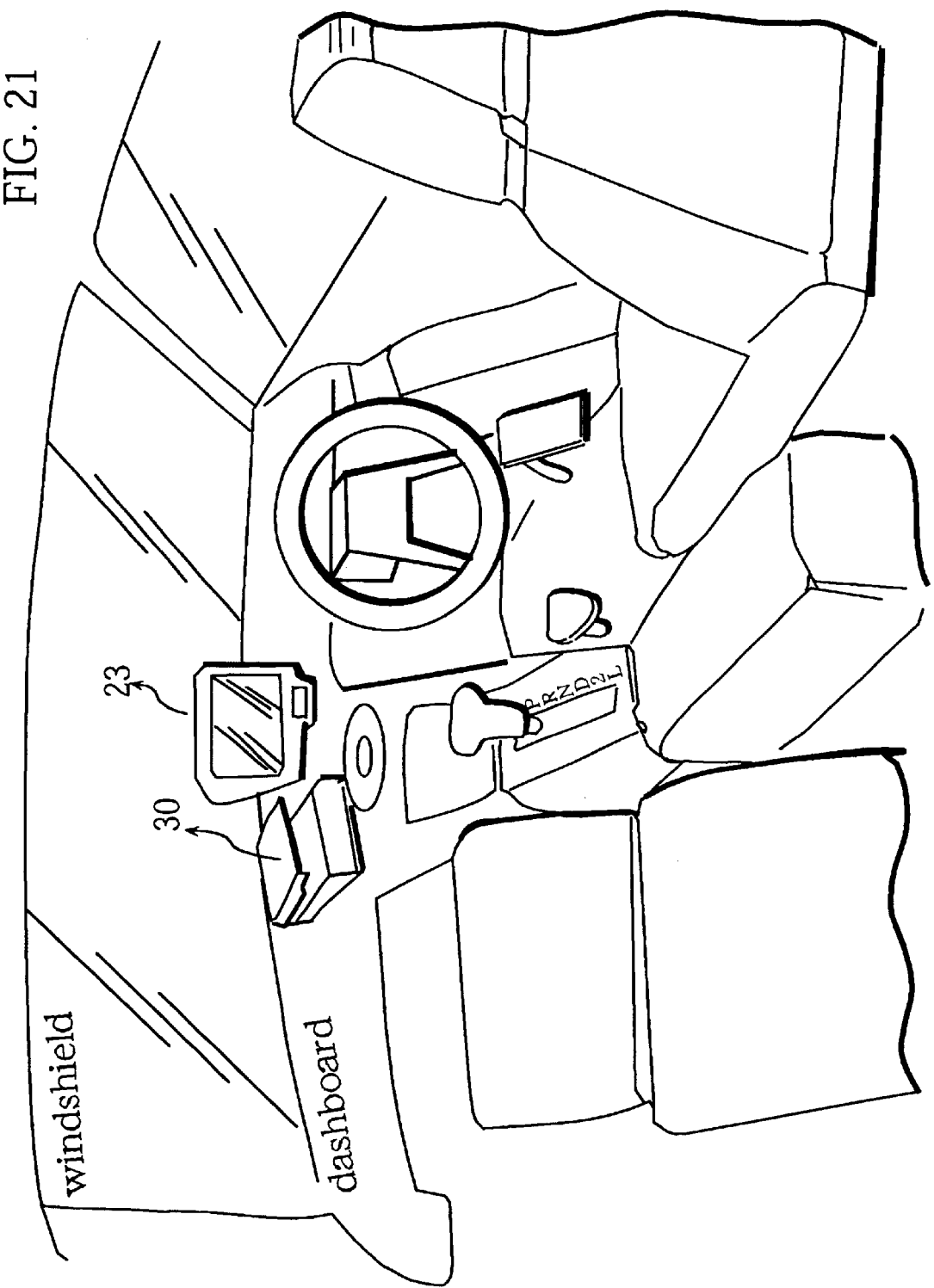
FIG. 21 shows a car navigation apparatus installed in a car.

Next, a car navigation apparatus installed in a car as the in-car player is explained. FIG. 21 shows an appearance of a car navigation apparatus 30 installed in the car.

Figure 22:
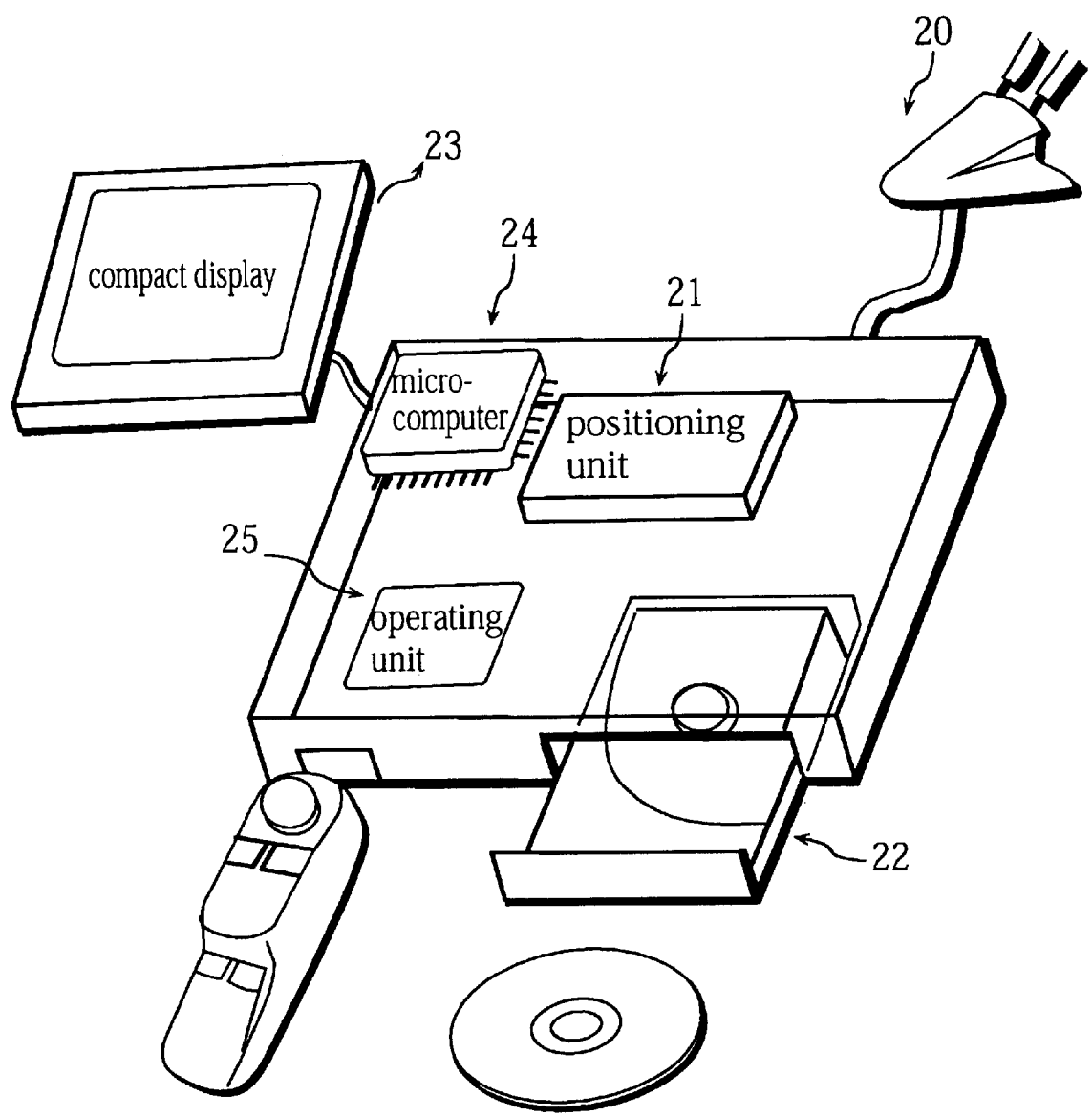
FIG. 22 shows the construction of the car navigation apparatus.

FIG. 22 shows the construction of the car navigation apparatus 30 installed in the car as shown in FIG. 21. As shown in FIG. 22, the car navigation apparatus 30 is composed of a GPS (Global Positioning System) antenna 20 for receiving radio waves, a positioning unit 21 for positioning the longitude, latitude, and altitude of the current car position, a driving mechanism 22 for setting the two-layer DVD 107 and for controlling the rotation of the two-layer DVD 107 and the reading of the data recorded on the two-layer DVD 107, a compact display 23 for displaying a map image of the peripheral area of the positioned longitude and latitude out of the map information, a microcomputer 24 for performing various controls in the car navigation apparatus 30, a keypad for receiving the user operations, and an operating unit 25 for receiving the operations performed using the remote controller 91 having a trackball. The microcomputer 24 has various functions, such as a destination setting function, a current position setting function, and a route searching function, for supporting the car drive.

After the two-layer DVD 107 is loaded on the driving mechanism 22, the microcomputer 24 has the map image displayed and has the map image scrolled as the car moves. Then, the microcomputer 24 has a menu displayed to show executable car drive supporting functions, such as the destination setting function, current position setting function, and route searching function. For example, when the determination operation is performed for the destination setting function or the route searching function on the menu, the microcomputer 24 reads the destination information recorded in the RAM information layer 109b of the two-layer DVD 107 and then executes the corresponding function using the read destination information.

Figure 23:
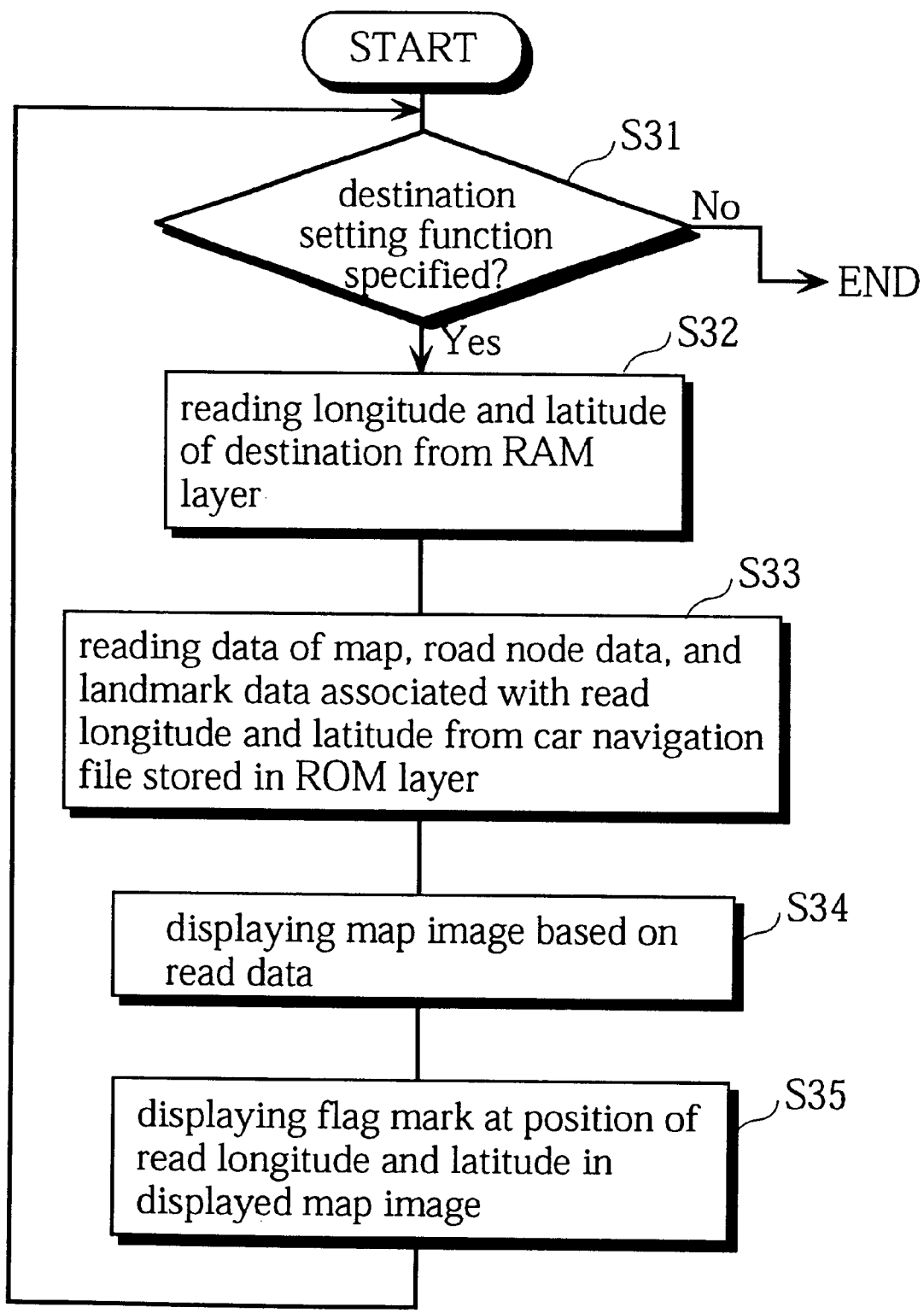
FIG. 23 is a flowchart showing processing performed by a microcomputer.
Figure 24:
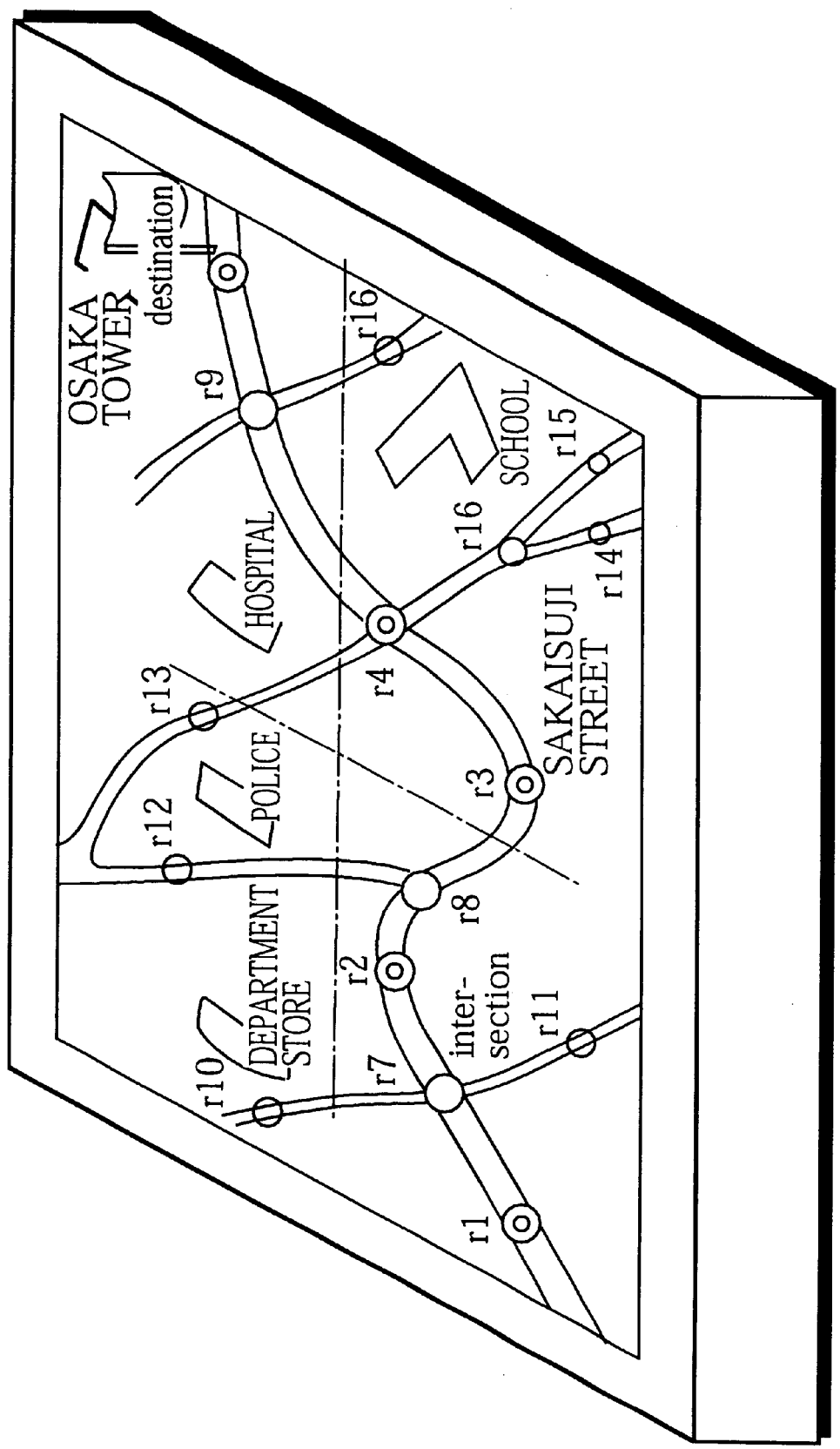
FIG. 24 shows a displayed content where a map image and a flag mark indicating the destination are superimposed.

FIG. 23 is a flowchart showing the processing for the destination setting function out of the car drive supporting functions presented by the microcomputer 24. If the function selected on the menu is not the destination setting function ("No" in step S31), the processing of this flowchart is terminated. If the selected function is the destination setting function ("Yes" in step S31), the microcomputer 24 reads the longitude and latitude of the destination from the RAM layer of the two-layer DVD 107 (step S32), and reads map data, road node data, and landmark data associated with the longitude and latitude of the determined destination from the car navigation file 116 stored in the ROM layer of the two-layer DVD 107 (step S33). The microcomputer 24 has the map image displayed on the compact display 23 in accordance with the map data, road node data, and landmark data read in step S33 (step S34). Then, the microcomputer 24 has a flag mark indicating the destination displayed at the position of the read longitude and latitude on the displayed map image (step S35). FIG. 24 shows the compact display 23 displaying the map image on which the flag mark indicating the destination is superimposed.

When executing the route searching function, the microcomputer 24 reads the road node data from the car navigation file 116 as well as reading coordinates of the destination from the RAM information layer 109b. Then, the microcomputer 24 searches a route from the current position to the determined destination, with the current position having been separately set.

By means of the present embodiment, the car navigation file 116 of the two-layer DVD 107 stores map data, road node data, and landmark data required for guiding the car, and the video title set 118 stores a plurality of video titles concerning facilities located in districts included in the map data. A VOB comprising one scene of a video image of a video title is a filmed shot in high picture quality, and using the DVD player, the video image can be displayed on the consumer TV set. As such, the whole family can decide the facilities to visit or not to visit in the house, enjoying the filmed shots introducing the facilities.

The VOB includes a writing command that indicates to write the position information of a position associated with the video information in the RAM information layer 109b when the predetermined operation is performed while the two-layer DVD 107 is being reproduced. When the disk reproduction apparatus executes the writing command, the position information can be written on the RAM information layer 109b. Consequently, the user can easily have the destination written in the two-layer DVD 107, enjoying the filmed shots introducing the moving picture data.

Accordingly, the whole family can set the destination in the house using their TV set in the relaxed mood.

The user brings the two-layer DVD 107 with the position information being written as the destination to the car and inserts it into the car navigation apparatus installed in the car. By doing so, the user can have the longitude and latitude of the destination displayed on the compact display 23 and also have the car navigation apparatus search the route from the current position to the written destination. Consequently, the car navigation apparatus reads the position information which has been easily written by the user in the house, displays the destination, and searches the route. In this way, the user can easily use the car drive supporting functions included in the car navigation apparatus. In addition, with reference to the position information written in the two-layer DVD 107, the car navigation apparatus can speedily performs the destination display and the route search. As a result, the family can start off on the trip early.

Although the present invention has been described according to the present embodiment, the present embodiment only shows a system example which realizes the optimum effects of the present invention. The same effects can be obtained using the following modifications (a) to (k).

(a) Although the information transfer from the DVD player 1 to the car navigation apparatus is realized by writing the destination information on the RAM information layer 109*b* in the present embodiment, the transfer of the destination information is not limited to this. For example, the destination information may be transferred via a remote controlling device. More specifically, the DVD player 1 and the car navigation apparatus may be respectively provided with a transmitting unit and a receiving unit for signals outputted from the remote controlling device, so that the destination information can be transferred from the DVD player 1 to the car navigation apparatus via the remote controlling device.

(b) The DVD player 1 may compress the destination information according to Huffman coding and display the compressed codes on the monitor. The user may input the compressed codes into the in-car player using keys so that the transfer between the DVD player 1 and the car navigation apparatus can be realized.

(c) The destination information may be transferred from the DVD player 1 to the car navigation apparatus via an audio tape. More specifically, the DVD player 1 may be provided with a device which converts the destination information to audio output signals and then outputs the audio output signals. The outputted audio output signals may be recorded on the audio tape using a cassette deck. Meanwhile, the car navigation apparatus may be provided with an interface which fetches the destination information from the audio tape. For example, the car navigation apparatus is usually installed together with the cassette deck, so that a serial interface unit may be set for receiving data from the cassette deck.

(d) In the present embodiment, the operations performed on the car navigation apparatus is received via the remote controller. However, the operations may be received via a light-pen. In this case, the car navigation apparatus detects a position which is correctly touched by the light-pen on the monitor using the method disclosed in Japanese Laid-Open Patent Application No. 3-325240. More specifically, the car navigation apparatus calculates the position touched by the light-pen on the displayed map image, and so specifies the longitude and latitude of the position indicated by the user in accordance with the calculation result. By means of this method, color of roads may be changed as disclosed in Japanese Laid-Open Patent Application No. 3-53272.

In addition, the DVD player 1 may also be provided with a light-pen as an interface, so that the same effect as in the car navigation apparatus can be expected.

(e) The non-in-car player may reproduce the car navigation standard part of the two-layer DVD 107. In this case, the non-in-car player previews route data that has been set so that the user can see how the route data is reflected on the map.

More specifically, the video title set 118 may store a control command including route data and a parameter storing a keyword value used for searching a map area which is to be displayed, and then reproduction control may be shifted from the video title set 118 to the car navigation file 116.

(f) When a moving picture displaying function can be provided in the construction of the in-car player, the video standard parts, such as the video title set 118, may be reproduced. As a result, the user can see guide information associated with the specified position on the map. In this case, the map information of the car navigation file 116 may store a control command including a title number and a PGC number as parameters, and then reproduction control may be shifted to the video standard parts.

(g) In the present embodiment, the sub-picture data includes the image data of subtitles. However, the sub-picture data may include vector graphics or three dimensional computer graphics (CG). With such arrangements, games can be realized in which compressed moving pictures of filmed shots and CG are mixed.

(h) In the present embodiment, a VOB unit consists of a GOP (Group of Picture). It is needless to say that if the stored moving pictures have a reproduction time of about a second, a VOB unit may consist of two or three GOPs with very short reproduction time. In this case, a management information pack is set before such a plurality of consecutive GOPs. The management information pack includes valid reproduction information for the plurality of GOPs.

(i) In the present embodiment, the PCM data and the AC-3 data are used for the audio data. However, other kinds of audio data such as compressed PCM data, MPEG audio data, and MIDI data may be used as far as the data can be interleaved in the system stream.

(j) In the present embodiment, the digital moving picture data under MPEG2 is used for the moving picture data. However, other kinds of moving picture data such as the digital moving picture data under MPEG1 and the digital moving picture data with a conversion algorithm other than DCT (Discrete Cosine Transform) under MPEG may be used as far as the moving picture data can form the multimedia data with the audio data and the sub-picture data.

(k) In the present embodiment, the management information packs are included in VOBUs in units of GOPs, being the units of reproducing moving picture data. However, it is needless to say that if the method for compressing digital moving pictures changes, the unit of the management information pack changes according to the compression method.

Finally, a method for producing an optical disk used in the present embodiment is described. The editor has to prepare master tapes such as video tapes of various shots filmed with video cameras and music tapes in which songs and sounds are recorded live. The moving pictures and sounds in the tapes are digitized and loaded into a nonlinear editing machine. The editor creates menus and items using application programs such as a graphic editor loaded in the editing machine, reproducing pictures and sounds frame by frame. The editor also creates management information packs having highlight commands by using a GUI generator and the like. Then, the editor encodes the above data under MPEG to create moving picture data, audio data, sub-picture data, and management information pack. Then, the editor creates the VOB unit and VOBs by using the nonlinear editing machine. The editor assigns numbers to the VOBs. Also, the editor creates PGC information #1, #2, #3, . . . , #n, and a VTS unit title search pointer table. The editor loads these pieces of data into a memory in a workstation.

The data is converted into logical data sequences so that the data is recorded in the file area. The logical data sequences are recorded into a medium such as the magnetic tape, then converted to physical data sequences. The physical data sequences include volume data with ECC (Error Check Code), Eight-to-Sixteen conversion, and data in the lead-in area and lead-out area. A master optical disk is produced by using the physical data sequences. Then, copies of the master optical disk are manufactured by using a pressing machine.

Conventional CD manufacturing machines may be used for manufacturing the above-constructed optical disk except a part of logical data sequences related to the data construction of the present invention. The details concerning this point are described in *Compact Disk Dokuhon* by Heitaro Nakajima and Hiroji Ogawa, published by Ohmu Ltd. and *Optical Disk System* by Applied Physics Society Optics Meeting, published by Asakura Shoten.

Although the present invention has been fully described by way of examples with reference to the accompanying drawings, it is to be noted that various changes and modifications will be apparent to those skilled in the art.

Therefore, unless such changes and modifications depart from the scope of the present invention, they should be constructed as being included therein.

What is claimed is:

1. An optical disk comprising:

a rewritable area;

a first read only area for storing map information that is used for navigating the car; and a second read only area for storing a plurality of pieces of video information concerning facilities located in districts included in the map information and for storing a writing command that position information concerning a position of one of the facilities that is associated with one of the plurality of pieces of video information be written in the rewritable area when a predetermined operation is performed during a reproduction of the piece of video information.

2. The optical disk of claim 1, wherein the first read only area further stores image data which is to be displayed for navigating the car, wherein the position information written in the rewritable area is referred as arrangement coordinates used for displaying a mark which indicates a destination on the image data.

3. The optical disk of claim 1, wherein the first read only area further stores road node data indicating roads where the car is able to run, wherein the position information written in the rewitable area is referred as destination coordinates when a route is searched using the road node data.

4. The optical disk of claim 3, wherein the first read only area and the second read only area are set on a same board and the rewritable area is set on a different board, with these boards being set between a first transparent substrate and a second transparent substrate.

5. A reproduction apparatus which reproduces an optical disk comprising a rewritable area, a first read only area for storing map information that is used for navigating the car, and a second read only area for storing a plurality of pieces of video information concerning facilities located in districts included in the map information and for storing a writing command that position information concerning a position of one of the facilities that is associated with one of the plurality of pieces of video information be written in the rewritable area when a predetermined operation is performed during a reproduction of the piece of video information, the reproduction apparatus comprising;

an optical pickup for optically reading data stored in the optical disk;

a driving mechanism for moving the optical pickup;

a moving picture decoder for decoding read video information;

a receiving means for receiving a predetermined operation performed by a user; and a controlling means for controlling the driving mechanism to move the optical pickup so that the video information is read, for controlling the driving mechanism to move the optical pickup so that the writing command corresponding to the video information is read, and for controlling the driving mechanism to move the optical pickup so that the position information included in the writing command is written in the rewritable area.

6. A reproduction apparatus which reproduces an optical disk comprising a rewritable area, a first read only area for storing map information that is used for navigating the car, and a second read only area for storing a plurality of pieces of video information concerning facilities located. in districts included in the map information and for storing a writing command that position information concerning a position of one of the facilities that is associated with one of the plurality of pieces of video information be written in the rewritable area when a predetermined operation is performed during a reproduction of the piece of video information, the reproduction apparatus comprising;

an optical pickup for optically reading data stored in the optical disk;

a driving mechanism for moving the optical pickup;

a controlling means for controlling the driving mechanism to move the optical pickup so that the map information is read, and for controlling the driving mechanism to move the optical pickup so that the position information written in the rewritable area is read; and a car drive supporting means for supporting a car drive in accordance with the read map information and the read position information.

7. The reproduction apparatus of claim 6, wherein the car drive supporting means includes;

a fist displaying means for displaying map image, and a second displaying means for displaying a mark indicating a destination at a point according to the read position information.

8. The reproduction apparatus of claim 7, wherein the car drive supporting means includes a route forming means for forming a car navigating route from a current car position to the destination on the map image.

* * * * *

UNITED STATES PATENT AND TRADEMARK OFFICE
CERTIFICATE OF CORRECTION

PATENT NO.    : 6,466,735 B1
DATED         : October 15, 2002
INVENTOR(S)   : Kozuka et al.

It is certified that error appears in the above-identified patent and that said Letters Patent is hereby corrected as shown below:

Column 20,
Line 29, delete ".".
Line 51, delete "fist" and insert -- first --.

Signed and Sealed this

First Day of July, 2003

JAMES E. ROGAN
*Director of the United States Patent and Trademark Office*